(12) United States Patent
Mizoguchi et al.

(10) Patent No.: US 9,511,541 B2
(45) Date of Patent: *Dec. 6, 2016

(54) FORMING APPARATUS AND FORMING METHOD

(71) Applicant: Asano Laboratories Co., Ltd., Aichi (JP)

(72) Inventors: Kenichi Mizoguchi, Aichi-gun (JP); Kazunori Teramoto, Toyota (JP)

(73) Assignee: Asano Laboratories Co., Ltd., Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,275

(22) Filed: Jul. 2, 2013

(65) Prior Publication Data
US 2013/0292041 A1 Nov. 7, 2013

Related U.S. Application Data

(63) Continuation of application No. 13/823,972, filed as application No. PCT/JP2011/076877 on Nov. 22, 2011.

(30) Foreign Application Priority Data

Oct. 4, 2011 (JP) ................................. 2011-220292
Oct. 4, 2011 (JP) ................................. 2011-220296

(51) Int. Cl.
*B29C 65/48* (2006.01)
*B29C 51/32* (2006.01)
(Continued)

(52) U.S. Cl.
CPC .............. *B29C 65/48* (2013.01); *B29C 51/16* (2013.01); *B29C 51/32* (2013.01); *B29C 51/428* (2013.01);
(Continued)

(58) Field of Classification Search
CPC .......... B29C 51/28; B29C 51/10; B29C 51/32; B29C 51/265; B29C 63/02; B29C 63/20; B29C 63/042
(Continued)

(56) References Cited

U.S. PATENT DOCUMENTS 3,514,509 A * 5/1970 Uldry Andre et al. ....... 264/549
4,707,208 A 11/1987 Crumbach et al.
(Continued)

FOREIGN PATENT DOCUMENTS

CN 102177010 A 9/2011
DE 1183353 B 12/1964
(Continued)

OTHER PUBLICATIONS

Office Action issued in Chinese Patent Application No. 201210333437.8; May 15, 2013; 19 pages.
(Continued)

*Primary Examiner* — Michael N Orlando
*Assistant Examiner* — Marta Dulko
(74) *Attorney, Agent, or Firm* — Wood Herron & Evans LLP

(57) ABSTRACT

A forming apparatus includes a base material jig provided on a base, adhesion means for making a sheet having an adhesion layer and covered to a base material retained on the base material jig adhere to the base material, and trimming means for performing trimming on the sheet with respect to the base material with the sheet adhered thereto, in a state in which the base material is not removed from the base material jig.

2 Claims, 13 Drawing Sheets

(51) Int. Cl.
*B29C 51/16* (2006.01)
*B29C 51/42* (2006.01)
*B29C 51/08* (2006.01)

(52) U.S. Cl.
CPC ........ *B29C 51/082* (2013.01); *B29C 2791/006* (2013.01); *Y10T 156/1002* (2015.01)

(58) Field of Classification Search
USPC ....................................................... 156/196
See application file for complete search history.

(56) References Cited

U.S. PATENT DOCUMENTS

| | | | |
|---|---|---|---|
| 4,838,973 | A | 6/1989 | Mentzer et al. |
| 6,096,166 | A | 8/2000 | Liou |
| 2005/0230864 | A1* | 10/2005 | Ozasa et al. ................. 264/102 |

FOREIGN PATENT DOCUMENTS

| | | | |
|---|---|---|---|
| DE | 2353460 | A1 | 4/1975 |
| DE | 3128977 | A1 | 2/1983 |
| FR | 2809656 | A1 | 12/2001 |
| GB | 2424612 | A | 10/2006 |
| JP | 60-049928 | A | 3/1985 |
| JP | 62-142628 | * | 6/1987 |
| JP | 63039320 | | 2/1988 |
| JP | 64-063129 | A | 3/1989 |
| JP | 64-063129 | * | 9/1989 |
| JP | 03-281227 | A | 12/1991 |
| JP | 07112483 | | 5/1995 |
| JP | 08-174671 | A | 7/1996 |
| JP | 8-318570 | | 12/1996 |
| JP | 11105122 | A | 4/1999 |
| JP | 3102916 | | 10/2000 |
| JP | 2002292670 | A | 10/2002 |
| JP | 2006-321178 | | 11/2006 |
| JP | 2008012674 | A | 1/2008 |
| JP | 4247706 | B | 4/2009 |
| JP | 2010076229 | A | 4/2010 |
| JP | 4491049 | | 6/2010 |
| JP | 2010-228143 | A | 10/2010 |

OTHER PUBLICATIONS

Notice of Allowance issued in JP 2011-220296, mailed on Jan. 10, 2012, with English translation (7 pages).
International Search Report issued in PCT/JP20111076877, mailed on Jan. 24, 2012, with English translation (5 pages).
Official Action issued in related Japanese Application No. 2011-220292, mailed on Jan. 4, 2012, with English translation (6 pages).
European Patent Office, Search Report issued in European Application No. 11872170.3, mailed Aug. 16, 2013, 8 pp.
European Patent Office, Search Report issued in European Application No. 13175179.4, mailed Aug. 16, 2013, 11 pp.
Taiwanese Patent Office, Office Action issued in Application No. 100142707, mailed Feb. 11, 2014, 9 pp.
Office Action issued in Chinese Patent Application No. 201180007800.0; Aug. 5, 2013; 10 pages.
Chinese Patent Office, Office Action issued in Chinese Application No. 201410549522.7 mailed on Aug. 3, 2016, 20 pages.

* cited by examiner

FORMING APPARATUS AND FORMING METHOD

TECHNICAL FIELD

The present invention relates to a forming apparatus and a forming method for thermoforming a sheet, thereby making the sheet adhere to a base material.

Priority is claimed on Japanese Patent Application Nos. 2011-220292 and 2011-220296, filed Oct. 4, 2011, the contents of which are incorporated herein by reference.

BACKGROUND ART

In the past, as an apparatus for making a sheet (a surface sheet) adhere to the outer surface of a formed base material, a vacuum press lamination forming apparatus has been known (refer, for example, to Patent Document 1). However, in the vacuum press lamination forming apparatus, there are problems as described below.

Since a heating method is in-chamber radiation heating and elongation occurs due to softening of a sheet by the heating, it is necessary to suppress sag due to the stretching. Therefore, adjustment of vacuum pressure in upper and lower chambers is performed, thereby maintaining a horizontal state of the sheet. However, since it is difficult to confirm the exact amount of elongation of the sheet, a temperature distribution of the entire surface of the sheet becomes non-uniform and reliable forming and adhesion cannot be obtained, and thus stable quality is not obtained. Furthermore, position shift of a printed sheet with respect to the shape of a base material is generated.

Furthermore, in a case in which the inside of the lower chamber which becomes a base material side is depressurized after heating of the sheet, since according to the depressurization rate, the sheet moves toward the base material, thereby adhering to the base material, there is a concern that a pressing force of the sheet to the base material may become insufficient. For this reason, in a case in which a complex concavo-convex shape is present in the outer shape of the base material, if the pressing force of the sheet to the base material is insufficient, air stays between the concavo-convex portion and the sheet, thereby causing degrading of quality.

Furthermore, in thermoforming by the upper and lower chambers in the related art, since the volumes of the chambers are large, it takes time to perform depressurization and a cycle time becomes long, and thus the forming efficiency is reduced.

Therefore, as an apparatus capable of solving the problems of such a vacuum press lamination forming apparatus, there is proposed a thermo-former employing heat plate heating (refer to Patent Document 2).

The thermo-former is a thermo-former employing heat plate heating, which includes a bottom frame having a space capable of accommodating a base material, and a heat plate having a heating surface capable of coming into close contact with a frame upper edge portion of the bottom frame, and makes a sheet adhere to a shaped mold or the base material by disposing the sheet between the bottom frame and the heat plate and thermoforming the sheet, wherein the bottom frame is provided with depressurization means which can fix the sheet to the frame upper edge portion and depressurizes the space below the sheet, the heat plate is provided with depressurization means for suctioning the heating surface side, heating means for heating the heating surface, and means for opening the heating surface side to the atmosphere or pressurizing the heating surface side, and the thermo-former further includes suction and heating control means for performing suction and heating operations by the heat plate in a state in which the bottom frame and the heat plate come into close contact with each other with the sheet interposed therebetween, depressurization control means for performing a depressurization operation in the space below the sheet, and forming operation control means for making the suction and heating operations by the suction and heating control means and the depressurization operation by the depressurization control means be simultaneously performed, stopping the suction and heating operations after a predetermined time from the start of these operations, and opening the gap between the heat plate and the sheet to the atmosphere or pressurizing the gap between the heat plate and the sheet.

Then, according to the thermo-former, high-quality forming can be realized regardless of the shape of the base material, alignment of a printed sheet with respect to the shape of the base material can be favorably performed, and a cycle time required for forming is shortened, whereby higher efficiency of forming can be attained.

PRIOR ART DOCUMENTS

Patent Documents

[Patent Document 1] Japanese Patent No. 3102916
[Patent Document 2] Japanese Patent No. 4491049

SUMMARY OF INVENTION

Technical Problem

A sheet which covers and adheres to a base material generally has a sufficient size, compared to the base material. Therefore, after adhesion to the base material, it is necessary to perform trimming on the sheet, thereby removing an extra site extending from the base material. However, in general, an adhesion layer is provided on the sheet and the sheet adheres to the base material through the adhesion layer.

Therefore, if an attempt to transport the base material with the sheet adhered thereto to a trimming device is made in order to perform trimming, since the adhesion layer of the sheet of the extra site extending from the base material adheres to hands, other jigs or devices, or the like during the transport, handling is very poor and productivity is significantly impaired. That is, if the adhesion layer adheres to hands, other jigs or devices, or the like, a time is required to peel off the adhesion layer. Furthermore, excessive force is applied at the time of the peeling, and thus there is a concern that the sheet may be peeled off from the base material or the sheet may be damaged.

However, in the vacuum press lamination forming apparatus of Patent Document 1 or the thermo-former employing heat plate heating of Patent Document 2, a special consideration for a disadvantage when the trimming is performed is not made.

In general, an adhesion layer is provided on a sheet which covers and adheres to a base material and the sheet adheres to the base material through the adhesion layer. In order to make the appearance of an obtained formed product better and further enhance an adhesive force to the base material, or the like, the sheet is generally formed in a sufficient size, compared to the base material, and a portion thereof is drawn onto and adheres to a bottom surface of the base material. Then, trimming on the sheet is performed outside a site which has adhered to the bottom surface, and thus an extra site extending from the base material is removed.

At that time, for example, in the thermo-former employing heat plate heating disclosed in Patent Document 2, treatment to make the sheet be drawn onto and adhere to the bottom surface of the base material is performed by blowing compressed air to the sheet which is located on the bottom surface of the base material.

However, in the blowing of the compressed air, it is not possible to sufficiently pressure-stick the sheet to the bottom surface of the base material, and therefore, adhesion of the sheet to the bottom surface of the base material is insufficient and there is a concern that peeling may occur in a portion. For example, in a case in which a formed product which is obtained is used as a component of home electrical appliances or an automobile, or the like, the presence or absence of peeling of the sheet is sometimes checked by performing a thermal shock test in a range of −30° C. to +80° C. However, if such a harsh test is performed, peeling sometimes occurs in the sheet which adheres to an edge portion (a peripheral edge portion) of the bottom surface of the base material.

Furthermore, it is also conceivable that the base material is removed from, for example, a base material jig and treatment to make the sheet adhere to the bottom surface of the base material is then performed in a separate apparatus from the forming apparatus. However, in this case, since the adhesion layer of the sheet of an extra site extending from the base material adheres to hands, other jigs or devices, or the like during transport, handling is very poor and productivity is significantly impaired. That is, if the adhesion layer adheres to hands, other jigs or devices, or the like, time is required to peel off the adhesion layer. Furthermore, excessive force is applied at the time of the peeling, and thus there is a concern that the sheet may be peeled off from the base material or the sheet may be damaged. In addition, in a case of performing transport to a separate apparatus after the adhesion layer is sufficiently hardened in order to prevent the adhesion layer from adhering to hands, other jigs or devices, or the like, the treatment to make the sheet adhere to the bottom surface of the base material cannot be performed.

The present invention has been made in view of the above-described circumstances and a first object is for providing a forming apparatus and a forming method, in which a disadvantage when performing trimming is solved and the productivity is improved.

A second object is for providing a forming apparatus and a forming method, in which the adhesive strength of a sheet that adheres to a bottom surface of a base material is increased, thereby preventing peeling of the sheet, and productivity is also improved.

A forming apparatus according to a first aspect of the invention includes: a base material jig provided on a base; adhesion means for making a sheet having an adhesion layer and covered to a base material retained on the base material jig adhere to the base material; and trimming means for performing trimming on the sheet with respect to the base material with the sheet adhered thereto, in a state in which the base material is not removed from the base material jig.

According to the forming apparatus, since the forming apparatus includes the trimming means for performing trimming on the sheet with respect to the base material with the sheet adhered thereto in a state in which the base material is not removed from the base material jig, it is not necessary to remove and transport the base material from the base material jig, and therefore, an adhesion layer of the sheet of an extra site extending from the base material is prevented from adhering to hands, other jigs or devices, or the like. That is, since the sheet of the extra site extending from the base material usually adheres to the base material jig, exposure of the adhesion layer is suppressed, and therefore, adhesion of the adhesion layer of the sheet of the extra site to hands, other jigs or devices, or the like is suppressed.

Furthermore, in the forming apparatus, it is preferable that the base material jig be formed to be smaller than the base material such that an outer peripheral portion of the base material extends further to the outside than a side peripheral surface of the base material jig and the side peripheral surface is located further to the inside than an outer peripheral surface of the base material and that the trimming means includes a blade arranged to face a bottom surface of the outer peripheral portion of the base material extending further to the outside than the side peripheral surface of the base material jig, and moving means for relatively moving the base material jig and the blade, thereby moving the bottom surface of the outer peripheral portion of the base material and the blade so as to be able to come into contact with and be separated from each other.

In this manner, trimming on the sheet can be easily and reliably performed by cutting the sheet by relatively moving the base material jig which retains the base material with the sheet adhered thereto and the blade by the moving means.

Furthermore, in the forming apparatus, it is preferable that the blade be provided at the base.

In this manner, after the sheet has adhered to the base material, trimming can be performed in the state as it is without moving the base material jig.

Furthermore, in the forming apparatus, it is preferable that the moving means includes biasing means for biasing the base material jig in a direction in which the base material retained on the base material jig is separated from the blade, and pressing means for pressing the base material retained on the base material jig in a direction in which the base material comes into contact with the blade.

In this manner, trimming on the sheet can be easily and reliably performed by pressing the base material against the biasing means by the pressing means, thereby moving the base material in a direction in which the base material comes into contact with the blade.

Furthermore, in the forming apparatus, the pressing means may be configured by using air pressure. Furthermore, the pressing means may be configured to include a pressing jig and a press mechanism which presses the pressing jig.

In this manner, it is possible to press the base material jig along with the base material still in a state in which the base material is retained on the base material jig, thereby moving the base material in a direction in which the base material comes into contact with the blade, and therefore, trimming on the sheet can be easily and reliably performed.

Furthermore, in the forming apparatus, it is preferable that the trimming means includes a blade arranged to face a side peripheral surface of the base material or the base material jig or an area between the side peripheral surfaces, and advancing and retreating means for advancing and retreating the blade toward the base material, the base material jig, or an area between the base material and the base material jig.

In this manner, trimming on the sheet can be easily and reliably performed by cutting the sheet by advancing and retreating the blade toward the base material, the base material jig, or the area between the base material and the base material jig by the advancing and retreating means.

A forming method according to a first aspect of the invention includes: a retaining process of making a base material be retained on a base material jig; an adhesion process of making a sheet having an adhesion layer cover and adhere to the base material; and a trimming process of performing trimming on the sheet in a state in which the base material with the sheet adhered thereto is not removed from the base material jig.

According to the forming method, since the forming method includes the trimming process of performing trimming on the sheet with respect to the base material with the sheet adhered thereto in a state in which the base material is not removed from the base material jig, it is not necessary to remove and transport the base material from the base material jig, and therefore, adhesion of the adhesion layer of the sheet of an extra site extending from the base material to hands, other jigs or devices, or the like is suppressed.

Furthermore, in the forming method, it is preferable that in the retaining process, the base material be retained on the base material jig such that an outer peripheral portion of the base material extends further to the outside than a side peripheral surface of the base material jig and the side peripheral surface of the base material jig is located further to the inside than an outer peripheral surface of the base material, and in the trimming process, trimming be performed by relatively moving a blade arranged to face a bottom surface of the outer peripheral portion of the base material extending further to the outside than the side peripheral surface of the base material jig, to the bottom surface of the outer peripheral portion of the base material, thereby cutting the sheet which has adhered onto the bottom surface.

In this manner, trimming on the sheet can be easily and reliably performed by relatively moving the blade to the bottom surface of the outer peripheral portion of the base material retained on the base material jig, thereby cutting the sheet which has adhered onto the bottom surface.

Furthermore, in the forming method, it is preferable that in the trimming process, trimming be performed by advancing and retreating a blade arranged to face a side peripheral surface of the base material or the base material jig or an area between the side peripheral surfaces, toward the base material, the base material jig, or an area between the base material and the base material jig, thereby cutting the sheet which is located on the base material, the base material jig, or the area between the base material and the base material jig.

In this manner, trimming on the sheet can be easily and reliably performed by advancing and retreating the blade toward the base material, the base material jig, or the area between the base material and the base material jig.

A forming apparatus according to a second aspect of the invention is a forming apparatus for making a sheet having an adhesion layer cover and adhere to a base material and includes a base material jig which is provided on a base and retains the base material, and adhesion means for making the sheet having the adhesion layer and covered to the base material retained on the base material jig adhere to the base material, wherein the base material jig is formed to be smaller than the base material such that an outer peripheral portion of the base material extends further to the outside than a side peripheral surface of the base material jig and the side peripheral surface is located further to the inside than an outer peripheral surface of the base material, a pressing section is provided on the base so as to face a bottom surface of the outer peripheral portion of the base material extending further to the outside than the side peripheral surface of the base material jig, and the forming apparatus further includes moving means for relatively moving the base material on the base material jig and the pressing section, thereby bringing the pressing section into contact with the bottom surface of the outer peripheral portion of the base material with the sheet interposed therebetween, so as to be able to come into contact with and be separated from the bottom surface.

According to the forming apparatus, since the forming apparatus includes the moving means for bringing the pressing section into contact with the bottom surface of the outer peripheral portion of the base material with the sheet interposed therebetween, so as to be able to come into contact with and be separated from the bottom surface, the adhesive strength of the sheet adhering to the base material can be increased by pressure-sticking the sheet to the bottom surface of the outer peripheral portion of the base material by the moving means. Furthermore, since pressure-sticking treatment of the sheet can be performed without removing the base material from the base material jig, when the sheet adheres to the bottom surface of the base material, the adhesion layer of the sheet of an extra site extending from the base material is prevented from adhering to hands, other jigs or devices, or the like.

Furthermore, in the forming apparatus, it is preferable that the moving means be configured to include biasing means for biasing the base material jig in a direction in which the base material retained on the base material jig is separated from the pressing section, and pressing means for pressing the base material retained on the base material jig in a direction in which the base material comes into contact with the pressing section.

In this manner, the sheet can be easily and reliably pressure-stuck to the bottom surface of the outer peripheral portion of the base material by pressing the base material against the biasing means by the pressing means, thereby moving the base material in a direction in which the base material comes into contact with the pressing section.

Furthermore, in the forming apparatus, the pressing means may be configured by using air pressure. Furthermore, the pressing means may be configured to include a pressing jig and a press mechanism which presses the pressing jig.

In this manner, it is possible to press the base material still in a state in which the base material is retained on the base material jig, thereby moving the base material in a direction in which the base material comes into contact with the pressing section, and therefore, the sheet can be easily and reliably pressure-stuck to the bottom surface of the outer peripheral portion of the base material.

Furthermore, in the forming apparatus, it is preferable that in the side peripheral surface of the base material jig, a concave portion be formed further to the base side than the bottom surface of the outer peripheral portion of the base material.

In this manner, when the sheet is pressure-stuck to the bottom surface of the outer peripheral portion of the base material by the moving means, a portion of the sheet escapes into the concave portion provided in the side peripheral surface of the base material jig and is accommodated therein, whereby it becomes possible to make the sheet uniformly come into contact with and adhere to the bottom surface without unevenness.

A forming method according to a second aspect of the invention includes the retaining process of making a base material be retained on a base material jig, and the adhesion process of making a sheet having an adhesion layer cover and adhere to the base material, wherein in the retaining process, the base material is retained on the base material jig such that an outer peripheral portion of the base material extends further to the outside than a side peripheral surface of the base material jig and the side peripheral surface of the base material jig is located further to the inside than an outer peripheral surface of the base material, the forming method further includes the pressure-sticking process of relatively moving a pressing section disposed to face a bottom surface of the outer peripheral portion of the base material to the bottom surface of the outer peripheral portion of the base material, thereby pressure-sticking the sheet which has adhered onto the bottom surface to the bottom surface, after the adhesion process.

According to the forming method, since in the pressure-sticking process after the adhesion process, the sheet which has adhered on the bottom surface is pressure-stuck to the bottom surface by relatively moving the pressing section to the bottom surface of the outer peripheral portion of the base material, the adhesive strength of the sheet adhering to the base material can be increased. Furthermore, since the pressure-sticking process of the sheet can be performed without removing the base material from the base material jig, when the sheet adheres to the bottom surface of the base material, the adhesion layer of the sheet of an extra site extending from the base material can be prevented from adhering to hands, other jigs or devices, or the like.

Furthermore, in the forming method, it is preferable that as the above-described base material jig, a base material jig in which a concave portion is formed further to the pressing section side than the bottom surface of the outer peripheral portion of the base material in the side peripheral surface of the base material jig be used.

In this manner, when the sheet is pressure-stuck to the bottom surface of the outer peripheral portion of the base material in the pressure-sticking process, a portion of the sheet escapes into the concave portion of the side peripheral surface of the base material jig and is accommodated therein, whereby it is possible to make the sheet uniformly come into contact with and adhere to the bottom surface without unevenness.

Furthermore, in the forming method, it is preferable that as the above-described base material, a base material in which a concave portion is formed on the base material jig side of the bottom surface of the outer peripheral portion extending further to the outside than the side peripheral surface of the base material jig be used.

In this manner, when the sheet is pressure-stuck to the bottom surface of the outer peripheral portion of the base material in the pressure-sticking process, a portion of the sheet escapes into the concave portion of the base material and is accommodated therein, whereby it is possible to make the sheet uniformly come into contact with and adhere to the bottom surface without unevenness.

Advantageous Effects of Invention

According to the forming apparatus and the forming method related to the first aspect of the invention, since trimming on the sheet is performed with respect to the base material with the sheet adhered thereto in a state in which the base material is not removed from the base material jig, adhesion of the adhesion layer of the sheet of an extra site extending from the base material, to hands, other jigs or devices, or the like, can be suppressed. Therefore, since there is no significant impairment of productivity due to adhesion of the adhesion layer of the sheet of the extra site to hands, other jigs or devices, or the like, as in the related art, productivity can be significantly improved, compared to the related art.

According to the forming apparatus and the forming method related to the second aspect of the invention, the adhesive strength of the sheet adhering to the bottom surface of the outer peripheral portion of the base material can be increased by pressure-sticking the sheet to the bottom surface by the pressing section. Therefore, peeling of the sheet is prevented and a defect due to peeling of the sheet can be prevented.

Furthermore, since the sheet can be pressure-stuck without removing the base material from the base material jig, and thus the adhesion layer of the sheet of an extra site extending from the base material is prevented from adhering to hands, other jigs or devices, or the like, there is no significant impairment of productivity due to adhesion of the adhesion layer of the sheet of the extra site to hands, other jigs or devices, or the like, and therefore, improvement in productivity can be attained.

DESCRIPTION OF EMBODIMENTS

Figure 1:
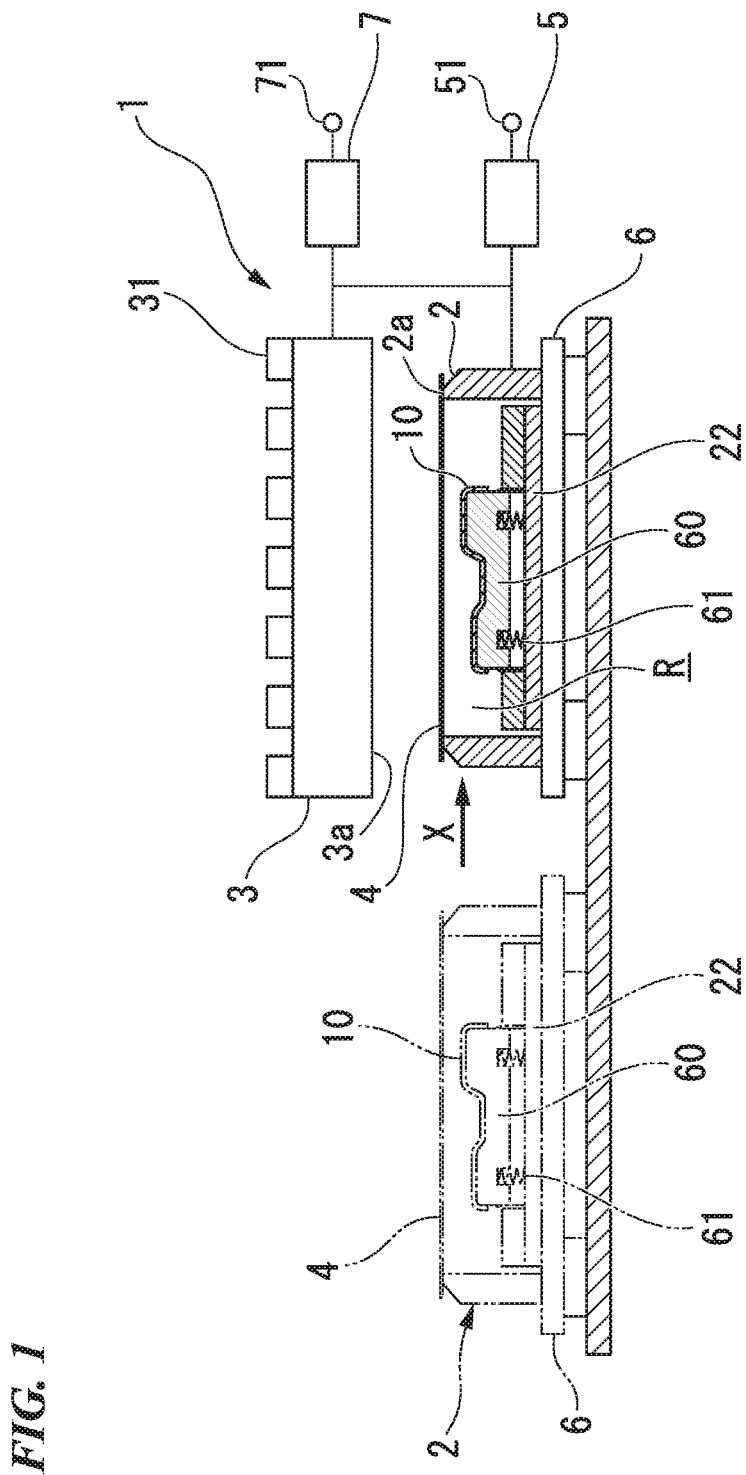
FIG. 1 is a diagram schematically showing the schematic configuration of a forming apparatus according to a first aspect of the invention.

Hereinafter, a forming apparatus and a forming method according to a first aspect of the invention will be described in detail referring to the drawings. In addition, in the following drawings, in order to show each member at a recognizable size, the scale of each member is appropriately changed.

Figure 2:
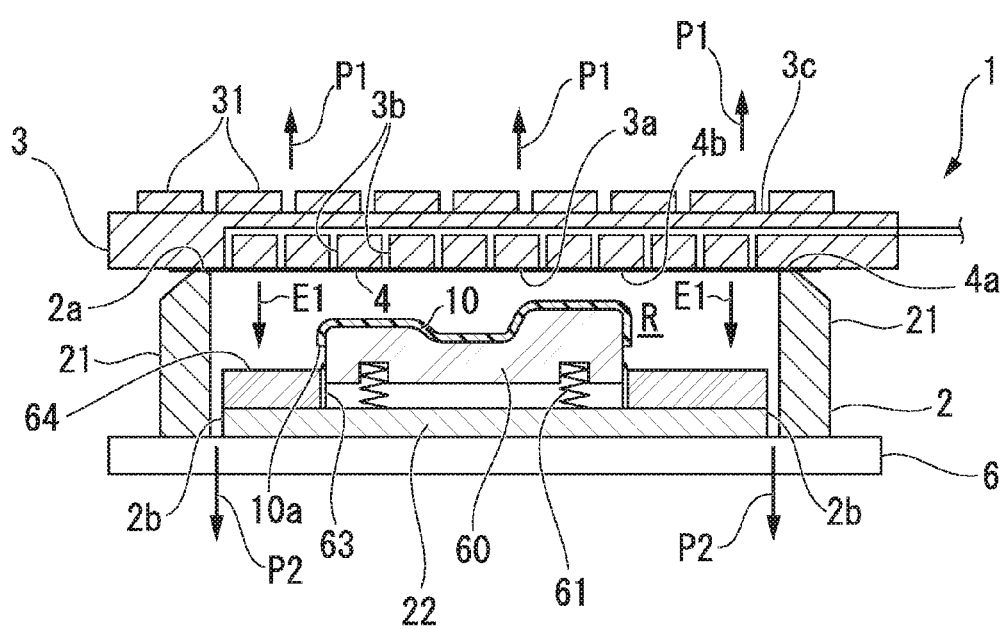
FIG. 2 is a cross-sectional side view showing the schematic configuration of a first embodiment of the forming apparatus according to the first aspect of the invention.

FIGS. 1 to 4 are diagrams showing a first embodiment of a forming apparatus according to a first aspect of the invention, and in these drawings, reference symbol 1 denotes the forming apparatus. The forming apparatus 1 is of a heat plate heating type and includes a bottom frame 2 having a space (an accommodation space R) capable of accommodating a base material jig 60, and a heat plate 3 having a heating surface 3a capable of coming into close contact with a frame upper edge portion 2a of the bottom frame 2, as shown in FIGS. 1 and 2. Then, the forming apparatus 1 has a configuration in which a sheet 4 made of resin is disposed between the bottom frame 2 and the heat plate 3 and the sheet 4 is then thermoformed, thereby adhering to a base material 10. Here, the bottom frame 2 and the heat plate 3 are disposed up and down and the heat plate 3 is disposed on the upper side with respect to the bottom frame 2.

As shown in FIG. 2, the bottom frame 2 is made of a metallic member and forms the accommodation space R in which four sides are surrounded by a peripheral wall portion 21 in a plan view, and a large number of vent holes 2b communicating with the accommodation space R are formed on the peripheral wall portion 21 side (the outer periphery side) of a base 22 which becomes a bottom. The vent holes 2b are connected to a vacuum tank 5 provided with a vacuum pump 51 shown in FIG. 1 and a configuration is made such that during forming, the accommodation space R is depressurized by performing vacuum suction by driving the vacuum pump 51.

As shown in FIG. 2, it is possible to fix the sheet 4 to an upper end (the frame upper edge portion 2a) of the peripheral wall portion 21 of the bottom frame 2 so as to close an opening of the accommodation space R.

Furthermore, the bottom frame 2 is provided on a stand 6 that can slide on a floor, and made so as to be able to advancing and retreating with respect to a forming position below the heat plate 3, as shown in FIG. 1.

The heat plate 3 has a flat plate shape in which the heating surface 3a has a smooth plane, and is formed in a larger shape that the bottom frame 2 in a plan view. Then, the heat plate 3 is provided to be vertically movable so as to come close to and be separated from (to be able to come into contact with and be separated from) the bottom frame 2 disposed at the forming position on the lower side, and configured so as to be disposed in close contact with the frame upper edge portion 2a of the bottom frame 2 in a state in which the heat plate 3 has moved downward.

In the heat plate 3, as shown in FIG. 2, a plurality of heaters 31 is provided on the upper surface 3c side and a plurality of vent holes 3b which is opened in the heating surface 3a are also provided. The vent holes 3b are connected to the vacuum tank 5 provided with the vacuum pump 51 which vacuum-suctions the heating surface 3a side, and a pressurizing tank 7 which stores air compressed by a compressor 71, as shown in FIG. 1. That is, depressurization loss can be reduced by providing the vacuum tank 5.

With such a configuration, during thermoforming, a configuration is made in which it is possible to perform vacuum suction from the bottom frame 2 by opening the vacuum tank 5 maintained in a vacuum state or perform pressurization toward the accommodation space R from the heating surface 3a by supplying compressed air from the pressurizing tank 7.

In addition, a configuration may be made such that the degree of vacuum is increased by directly performing suction by driving of the vacuum pump 51 without providing the vacuum tank 5.

Figure 3A:
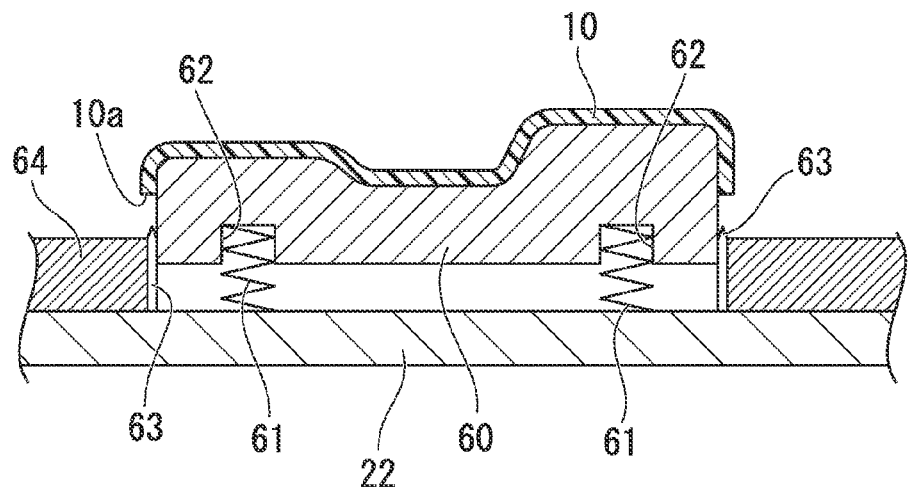
FIG. 3A is a partial cross-sectional view showing the operating procedure of the forming apparatus shown in FIG. 2.

As shown in FIG. 2, the base material jig 60 is a member made of metal or the like disposed on the base 22 and is made so as to deposit and retain the base material 10 made of resin or the like on an upper portion thereof. In this embodiment, the base material jig 60 is formed such that the shape thereof in a plan view is slightly small compared to the base material 10, as shown in FIG. 3A. Therefore, the base material 10 is retained on the base material jig 60 in a state in which an outer peripheral portion thereof extends further to the outside than the side peripheral surface of the base material jig 60 and covers an upper portion of the side peripheral surface of the base material jig 60. That is, the base material jig 60 is formed and disposed such that the side peripheral surface thereof is located further to the inside than the outer peripheral portion of the base material 10.

Furthermore, in this embodiment, the base material jig 60 is configured so as to be able to move up and down with respect to the base 22, that is, be able to move between a state in which the base material jig 60 comes into contact with or is close to the upper surface of the base 22 and a state in which the base material jig 60 is sufficiently separated from the upper surface of the base 22. Specifically, a coil spring 61 as biasing means is provided in plural on the bottom surface side of the base material jig 60. Each of the coil springs 61 is disposed such that one end side is accommodated in each of concave accommodation portions 62 formed and disposed at appropriate intervals at an outer peripheral portion of a bottom surface of the base material jig 60 and the other end is disposed in contact with the upper surface of the base 22. Due to such a configuration, the base material jig 60 is biased in a direction away from the upper surface of the base 22 by the coil springs 61, and therefore, at a normal time, that is, at the time of non-pressing, the base material jig 60 is in a state of floating at a predetermined distance from the base 22, as shown in FIGS. 2 and 3A.

Furthermore, in this embodiment, a configuration is made such that compressed air is introduced into the accommodation space R by the pressurizing tank 7 provided with the compressor 71, whereby the base material jig 60 retains the base material 10, and in a state in which the sheet 4 has covered and adhered to the base material 10, as will be described later, the base material jig 60 is pressed by the introduced compressed air, thereby moving down toward the base 22. In this embodiment, air pressure of the compressed air by the pressurizing tank 7 becomes pressing means and configures moving means along with the biasing means (the coil spring 61).

Furthermore, as shown in FIG. 3A, in this embodiment, a blade 63 is disposed at and fixed to the base 22 at a position corresponding to an outer periphery of the base material jig 60, that is, an outer position close to the side peripheral surface of the base material jig 60. The blade 63 is an annular blade disposed upward and has a shape corresponding to the shape in a plan view of the base material jig 60. Therefore, the blade 63 is disposed to face a bottom surface 10a of an outer peripheral portion of the base material 10 which extends further to the outside than the side peripheral surface of the base material jig 60. In addition, since at a normal time (the time of non-pressing), the base material jig 60 is in a state of floating at a predetermined distance from the base 22, at a normal time (the time of non-pressing), a tip of the blade 63 is in a state of being separated from the bottom surface 10a of the base material 10.

With such a configuration, the moving means moves the base material jig 60 toward the blade 63, whereby the blade 63 can relatively move to the bottom surface 10a of the outer peripheral portion of the base material 10. In this embodiment, a trimming means is configured by such moving means and the blade 63.

In addition, a cover 64 which covers the outer side surface of the blade 63 is provided on the outer periphery side of the blade 63. The cover 64 is provided on the outer side surface side of the blade 63 such that only a tip portion of the blade 63 protrudes from the upper end surface thereof, and is for preventing the sheet 4 from adhering to the outer side surface of the blade 63. The cover 64 may be provided at the entirety on the base 22 except for a portion inside the blade 63 and may also be provided at only a portion in the vicinity of the blade 63. However, the cover 64 is disposed so as not to block the vent holes 2b of the bottom frame 2. Furthermore, in a case in which the length of the blade 63 which protrudes above the base 22 is sufficiently short, the cover may be omitted.

The sheet 4 is a known multilayer sheet having a printed layer, a protective film or a carrier film provided on the surface of the printed layer, and an adhesion layer provided on the back face side of the printed layer. An outer peripheral portion 4a of the sheet 4 is fixed in a horizontal state to the frame upper edge portion 2a of the bottom frame 2 by fixing means (not shown), as shown in FIG. 2. The base material 10 side (the lower surface 4b side) of the sheet 4 is the adhesion layer, and in a state in which the sheet 4 has been fixed to the bottom frame 2, a gap is formed between the lower surface 4b and the base material 10. In addition, if the size of the gap between the base material 10 and the heat plate 3 (the sheet 4) is, for example, approximately 5 mm, forming is possible, and a concave portion (the accommodation space R) of the bottom frame 2 can be minimized by making the gap small.

Then, the forming apparatus 1 has a configuration having forming operation means (not shown) for making suction and heating operations by the heat plate 3 and a depressurization operation of the accommodation space R below the sheet 4 be simultaneously performed in a state in which the bottom frame 2 and the heat plate 3 come into close contact with each other with the sheet 4 interposed therebetween, stopping the suction operation by the heat plate 3 after a predetermined time from the start of these operations, and opening the gap between the heat plate 3 and the sheet 4 to the atmosphere or pressurizing the gap between the heat plate 3 and the sheet 4. That is, in the forming apparatus 1, adhesion means for making the sheet 4 adhere to the base material 10 retained on the base material jig 60 is configured by depressurization means which is configured by the bottom frame 2, the heat plate 3, and the vacuum tank 5, pressurizing means which is configured by the pressuring tank 7, or the like. In addition, the forming operation means refers to, for example, means provided with a control circuit for performing the above-described operations.

Next, a forming method by the forming apparatus 1 will be described.

First, as shown in FIG. 1, the base material 10 is set on the base material jig 60 disposed on the base 22 of the bottom frame 2, thereby being deposited and retained on the base material jig 60 (a retaining process). In addition, in this state, the base material jig 60 is biased upward by the action of the coil springs 61, thereby being in a state of floating above the base 22.

Subsequently, the sheet 4 is placed on the frame upper edge portion 2a of the bottom frame 2 and brought into close contact with the bottom frame 2. That is, the sheet 4 is fixed to the frame upper edge portion 2a of the peripheral wall portion 21 of the bottom frame 2 so as to close the opening of the accommodation space R.

Then, the bottom frame 2 with the base material 10 set thereon is moved to the forming position below the heat plate 3 (in a direction of arrow X in FIG. 1).

Next, as shown in FIG. 2, the heat plate 3 is moved downward, thereby bringing the outer peripheral portion of the heating surface 3a into close contact with the frame upper edge portion 2a of the bottom frame 2 with the sheet 4 interposed therebetween. At this time, the sheet 4 is disposed in a state in which the entire surface of the upper surface is almost in contact with the heating surface 3a of the heat plate 3, and enters a state in which the outer peripheral portion 4a thereof is pinched by the bottom frame 2 and the heat plate 3.

Subsequently, the gap between the heat plate 3 and the sheet 4 is depressurized, and thus the sheet is suctioned and stuck to the heating surface 3a and then heated. Furthermore, simultaneously with the heating process, the accommodation space R below the sheet 4 is depressurized.

Specifically, the heat plate 3 is heated by the heaters 31 and also the vacuum tank 5 is opened, thereby vacuum-suctioning the sheet 4 through the vent holes 3b in a direction (a direction of arrow P1 in FIG. 2) in which the sheet 4 moves toward the heating surface 3a of the heat plate 3. In this manner, the sheet 4 is suctioned and stuck to the heating surface 3a and the suctioned and stuck sheet 4 is heated.

Figure 4:
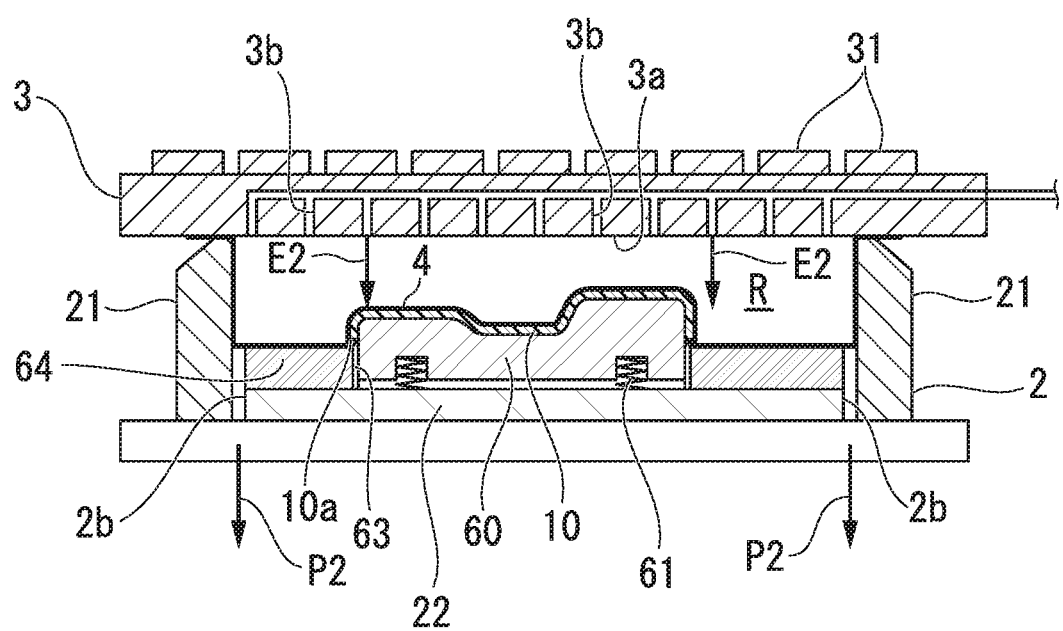
FIG. 4 is a cross-sectional side view showing the operating procedure of a forming method following FIG. 2, of the forming apparatus shown in FIG. 2.

Furthermore, during the heating, in the bottom frame 2, as shown in FIG. 4, the vacuum tank 5 is opened, thereby performing vacuum suction through the vent holes 2b in a direction (a direction of arrow P2) in which the sheet 4 moves downward. In this manner, air in the accommodation space R below the sheet 4 is suctioned in a direction of arrow E1 in FIG. 2, and thus the accommodation space R is depressurized, thereby entering a state of the high degree of vacuum.

Subsequently, the suction operation of the sheet 4 is stopped in a state in which the above-described depressurization operation of the accommodation space R is maintained, and the gap between the heat plate 3 and the sheet 4 is opened to the atmosphere or pressurized toward the bottom frame 2 side.

Specifically, the sheet 4 suctioned and stuck to the heat plate 3 is heated to a predetermined temperature, and after the lapse of a predetermined period of time, vacuum suction on the heat plate 3 side is stopped, and thus the suction operation is stopped. In this manner, since the gap between the heat plate 3 and the sheet 4 is opened to the atmosphere, a difference in pressure occurs between upper and lower spaces across the sheet 4. For this reason, as shown in FIG. 4, the sheet 4 softened by heating is separated from the heating surface 3a of the heat plate 3, moves in a direction of arrow E2 toward the base 22 (the base material 10) of the bottom frame 2 below the sheet 4, and is pressed against the surface of the base material 10, thereby covering and adhering to the surface of the base material 10 (an adhesion process).

Figure 3B:
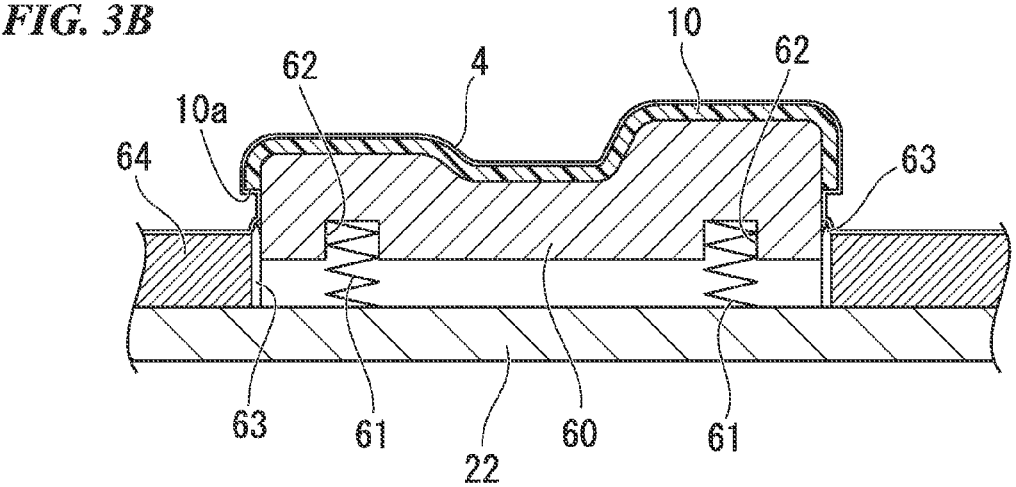
FIG. 3B is a partial cross-sectional view showing the operating procedure of the forming apparatus shown in FIG. 2.

At that time, since the accommodation space R is uniformly depressurized, the sheet 4 adheres to the bottom surface 10a of the outer peripheral portion of the base material 10 and an area from a portion of the side peripheral surface of the base material jig 60 to the upper surface of the cover 64, as shown in FIG. 3B. Even if the sheet 4 adheres to the base material 10 in this manner, since in this state, pressure enough to move the base material jig 60 down is not applied to the base material jig 60, the base material jig 60 does not move down toward the base 22 and is maintained in a floating state by the coil springs 61.

In addition, when the gap between the heat plate 3 and the sheet 4 is opened to the atmosphere, the accommodation space R may be pressurized by ejecting the compressed air from the vent holes 3b of the heat plate 3 by performing switching from the vacuum tank 5 to the pressurizing tank 7 shown in FIG. 1. However, applied pressure at that time is set to be sufficiently smaller than the biasing force of the coil spring 61 that biases the base material jig 60, such that the base material jig 60 does not move down.

Thereafter, the compressed air having pressure set in advance is introduced from the pressurizing tank 7 shown in FIG. 1 through the vent holes 3b of the heat plate 3 into the accommodation space R. The pressure (the pressure set in advance) of the compressed air which is introduced, that is, air pressure is set to be pressure sufficiently larger than pressure when opening the gap between heat plate 3 and the sheet 4 to the atmosphere previously or performing pressurization toward the bottom frame 2 side, that is, pressure larger than the biasing force of the coil spring 61 which biases the base material jig 60.

If the compressed air having pressure set in advance is introduced from the pressurizing tank 7 into the accommodation space R in this manner, the compressed air presses the sheet 4 which is located on the entire face on the opening side of the accommodation space R, thereby pressing the base material jig 60 along with the base material 10 through the sheet 4. Then, since the pressure of the compressed air (the air pressure) is pressure larger than the biasing force of the coil spring 61, as described above, the base material jig 60 moves down while still in a state of retaining the base material 10, as shown in FIG. 3B.

If the base material jig 60 moves down in this manner and at the same time, the base material 10 is also pressed, thereby moving down, since the blade 63 is disposed at the base 22 so as to face the bottom surface 10a of the outer peripheral portion of the base material 10, the blade 63 relatively moves toward the bottom surface 10a of the base material 10, thereby cutting the sheet 4 which has adhered onto the bottom surface 10a. That is, trimming on the sheet 4 which has adhered onto the base material 10 is performed.

Subsequently, the introduction of the compressed air from the pressurizing tank 7 is stopped and the inside of the accommodation space R is returned to atmospheric pressure again. Then, due to opening from a pressurization state (a pressing state), the base material jig 60 moves up again by the action of the coil springs 61, thereby entering a state of floating from the base 22. In this manner, the blade 63 is separated from the bottom surface 10a of the base material 10 and trimming is completed, and thus a formed product is completed (a trimming process).

If the trimming process is completed in this manner, the heat plate 3 is moved upward and the bottom frame 2 is then laterally moved along with the stand 6 shown in FIG. 1, thereby being moved from a position below the heat plate 3. Then, the completed formed product (the base material 10 covered with the sheet 4 and with the sheet 4 adhered thereto) is removed from the base material jig 60 and taken out of the accommodation space R, whereby a series of forming operations are completed.

In the forming apparatus 1 and the forming method using the forming apparatus 1, since trimming on the sheet 4 is performed with respect to the base material 10 with the sheet 4 adhered thereto, by the trimming means which includes the blade 63 and the moving means, in a state in which the base material 10 is not removed from the base material jig 60, it is not necessary to remove and transport the base material 10 from the base material jig 60, and therefore, the adhesion layer of the sheet 4 of an extra site extending from the base material 10 can be reliably prevented from adhering to hands, other jigs or devices, or the like. That is, after the sheet 4 has adhered to the base material 10, it is possible to finish trimming without exposing the adhesion layer of the sheet 4.

Therefore, peeling of the sheet 4 from the base material 10 or damage to the sheet 4, as in the related art, is prevented, and thus productivity can be significantly improved.

Furthermore, since a configuration is made such that the sheet 4 is cut by relatively moving the base material jig 60 which retains the base material 10 with the sheet 4 adhered thereto, and the blade 63 by the moving means, that is, the coil springs 61 as the biasing means and the air pressure as the pressing means, trimming on the sheet 4 can be easily and reliably performed.

In addition, in this embodiment, the coil spring 61 is used as the biasing means. However, instead of the coil spring 61, an elastic body such as rubber may also be used.

Furthermore, in this embodiment, the moving means is configured to include the biasing means and the pressing means. However, instead of such moving means, moving means capable of moving the base material jig 60 up and down may also be used.

As this moving means, for example, a known air cylinder mechanism capable of moving the base material jig 60 up and down can be used. However, in this case, it is preferable to provide a mechanism, for example, a fixing mechanism by vacuum suction or the like, which fixes the base material 10 to the base material jig 60 such that when the base material jig 60 is moved down by the air cylinder mechanism, the base material 10 is also moved down along with the base material jig 60. However, since when the sheet 4 adheres to the base material 10, a portion thereof also adheres to the side peripheral surface of the base material jig 60, the base material jig 60 and the base material 10 are integrated through the sheet 4. Therefore, since when the base material jig 60 is moved down, the base material 10 is also moved down together, the above-described fixing mechanism can also be omitted.

Figure 5A:
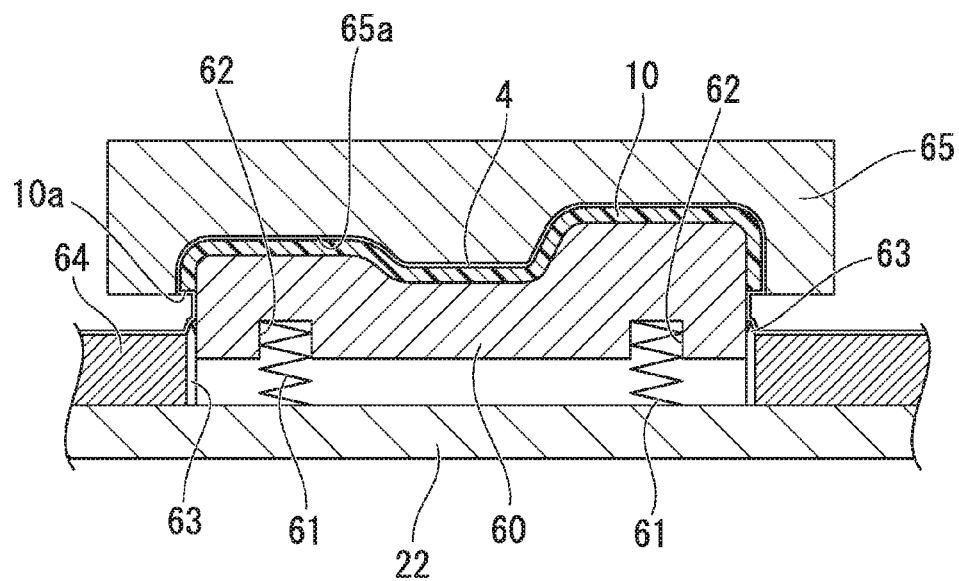
FIG. 5A is a partial cross-sectional view showing the schematic configuration and the operating procedure of a second embodiment of the forming apparatus according to the first aspect of the invention.
Figure 5B:
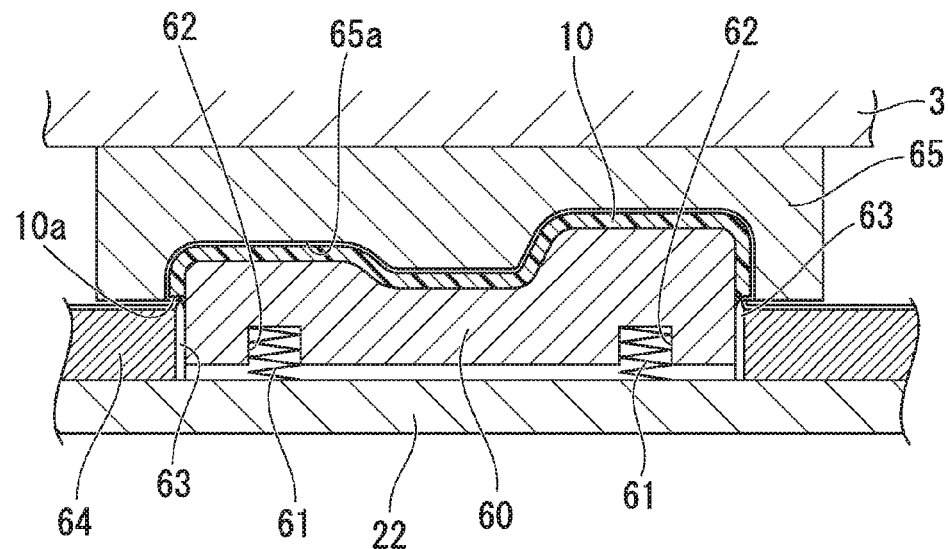
FIG. 5B is a partial cross-sectional view showing the schematic configuration and the operating procedure of the second embodiment of the forming apparatus according to the first aspect of the invention.

FIGS. 5A and 5B are diagrams showing a second embodiment of the forming apparatus according to the first aspect of the invention.

The forming apparatus shown in FIGS. 5A and 5B is different from the forming apparatus 1 shown in FIGS. 1 to 4 in that as the pressing means in the above-described moving means, instead of using the air pressure by the pressurizing tank 7, a pressing jig 65 and the heat plate 3 as a press mechanism are used.

That is, in this embodiment, the pressing jig 65 made of resin, metal, or the like is disposed separately from the heat plate 3 or the bottom frame 2. The pressing jig 65 has a concave portion 65a which is engaged with the outer surface of the base material 10 so as to nearly cover the outer surface of the base material 10, and is made so as to be moved onto the base material 10 on the base material jig 60 by a movement mechanism (not shown) and deposited on the base material 10. Furthermore, the pressing jig 65 may also be made so as to be deposited on the base material 10 by human hands without being configured so as to be automatically deposited on the base material 10 by the movement mechanism.

In a forming method by the forming apparatus provided with the pressing jig 65, after the sheet 4 has adhered to the base material 10, as shown in FIG. 3B, the heat plate 3 is moved up first, and thus the accommodation space R of the bottom frame 2 is opened. Then, the pressing jig 65 is deposited on the base material 10 with the sheet 4 adhered thereto, by the above-described movement mechanism or human hands, as shown in FIG. 5A.

Subsequently, the heat plate 3 is moved down again so as to function as the press mechanism, as shown in FIG. 5B, and thus the pressing jig 65 is pressurized and moved down. Then, since a pressing force which is applied toward the base material 10 through the pressing jig 65, that is, applied pressure by the heat plate 3 becomes pressure larger than the biasing force of the coil spring 61, the base material jig 60 moves down while still in a state of retaining the base material 10.

In this manner, the base material jig 60 moves down and at the same time, the base material 10 is also pressed, thereby moving down, whereby the blade 63 relatively moves toward the bottom surface 10a of the base material 10, thereby cutting the sheet 4 which has adhered onto the bottom surface 10a, in the same manner as the foregoing first embodiment. That is, trimming on the sheet 4 which has adhered onto the base material 10 is performed.

Subsequently, the heat plate 3 is moved up again. Then, due to opening from a pressing state, the base material jig 60 moves up again by the action of the coil springs 61, thereby entering a state of floating from the base 22. In this manner, the blade 63 is separated from the bottom surface 10a of the base material 10 and trimming is completed, and thus a formed product is completed.

Thereafter, the pressing jig 65 is removed from above the base material 10 and then, the completed formed product (the base material 10 covered with the sheet 4 and with the sheet 4 adhered thereto) is taken out in the same manner as the first embodiment, whereby a series of forming operations are completed.

Also in such a forming apparatus and the forming method using the forming apparatus, since trimming on the sheet 4 is performed with respect to the base material 10 with the sheet 4 adhered thereto, by the trimming means which includes the blade 63 and the moving means having the pressing means, in a state in which the base material 10 is not removed from the base material jig 60, it is not necessary to remove and transport the base material 10 from the base material jig 60, and therefore, the adhesion layer of the sheet 4 of an extra site extending from the base material 10 can be reliably prevented from adhering to hands, other jigs or devices, or the like.

Therefore, peeling of the sheet 4 from the base material 10 or damage to the sheet 4, as in the related art, is prevented, and thus productivity can be significantly improved.

Figure 6:
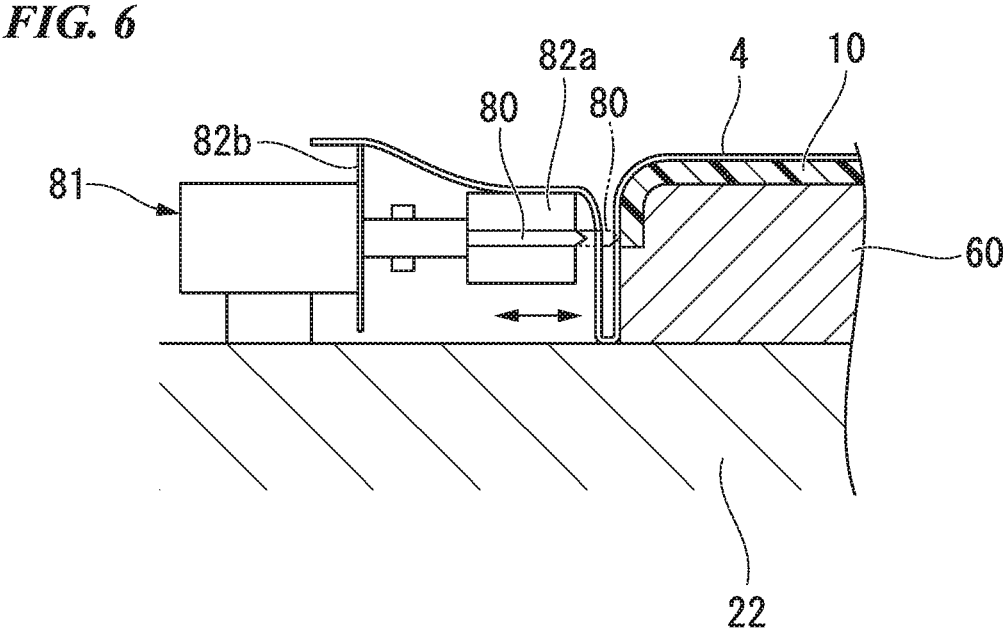
FIG. 6 is a partial cross-sectional view for describing a third embodiment of the forming apparatus according to the first aspect of the invention.

FIG. 6 is a diagram showing a third embodiment of the forming apparatus according to the first aspect of the invention.

The forming apparatus shown in FIG. 6 is different from the forming apparatus 1 shown in FIGS. 1 to 4 in that the trimming means is configured to include a blade 80 and advancing and retreating means 81. In addition, in this embodiment, the outer shape in a plan view of the base material jig 60 is nearly the same as the outer shape in a plan view of the base material 10, and therefore, the side peripheral surface of the base material jig 60 and the outer peripheral surface of the base material 10 are configured so as to be nearly flush with each other.

The blade 80 is different from the blade 63 shown in FIGS. 1 to 5B and is horizontally disposed to face the side peripheral surface of the base material 10 or the base material jig 60 or an area between the side peripheral surface of the base material 10 and the side peripheral surface of the base material jig 60 (in FIG. 6, the blade 80 is disposed to face the side peripheral surface of the base material 10).

The blade 80 is made such that a plurality of blades is put together and disposed annularly in a plan view, the respective blades advancing and retreating without interfering with each other, thereby simultaneously or sequentially cutting (cutting into) an outer periphery of the base material 10 or the base material jig 60, and as a result, the sheet of an extra site which is located at the outer periphery of the base material 10 is removed and trimmed. In addition, a cover 82a which covers the side surface of the blade 80 makes only a tip portion of the blade 80 protrude, and also guides advancing and retreating of the blade 80 is provided around the blade 80. Furthermore, a cover 82b which prevents sticking of the sheet 4 is also provided at the advancing and retreating means 81.

The advancing and retreating means 81 is disposed on the stand 22 to correspond to each of the blades constituting the blade 80, is configured to include a known air cylinder mechanism or the like, retains and fixes the blade 80 described above, and advances and retreats the blade 80 toward the base material 10. In addition, an orbiting mechanism may also be provided in the advancing and retreating means 81 so as to make the advancing and retreating means 81 along with the blade 80 orbit around the base material 10 (the base material jig 60). In this case, the blade 80 can be made to be a single blade without being configured by a plurality of blades.

In a forming method by the forming apparatus provided with such trimming means, if the sheet 4 adheres to the base material 10, as shown in FIG. 3B, the outer peripheral portion of the sheet 4 adheres to the side peripheral surface of the base material 10 and a portion of the side peripheral surface of the base material jig 60 and further covers the advancing and retreating means 81 or the cover 82*a*, as shown in FIG. 6.

Subsequently, the advancing and retreating means 81 is operated, thereby advancing the blade 80, as shown by a two-dot chain line in FIG. 6.

Then, the blade 80 cuts into the sheet 4 and comes into contact with the side peripheral surface of the base material 10. In this manner, the sheet 4 which has adhered to the side peripheral surface of the base material 10 is cut, and thus trimming on the sheet 4 is performed.

Thereafter, the blade 80 is retreated by the advancing and retreating means 81. In this manner, trimming is completed, and thus a formed product is completed.

Then, the completed formed product is taken out in the same manner as the first embodiment, whereby a series of forming operations are completed.

In such a forming apparatus and the forming method using the forming apparatus, since trimming on the sheet 4 is performed with respect to the base material 10 with the sheet 4 adhered thereto, by the trimming means which includes the blade 80 and the advancing and retreating means 81, in a state in which the base material 10 is not removed from the base material jig 60, it is not necessary to remove and transport the base material 10 from the base material jig 60, and therefore, the adhesion layer of the sheet 4 of an extra site extending from the base material 10 can be reliably prevented from adhering to hands, other jigs or devices, or the like.

Therefore, peeling of the sheet 4 from the base material 10 or damage to the sheet 4, as in the related art, is prevented, and thus productivity can be significantly improved.

In addition, the blade 80 can be disposed corresponding to a desirable covering state of the sheet 4 with respect to the base material 4 so as to face any of the side peripheral surface of the base material 10, the side peripheral surface of the base material jig 60, and an area between the side peripheral surface of the base material 10 and the side peripheral surface of the base material jig 60.

Figure 7:
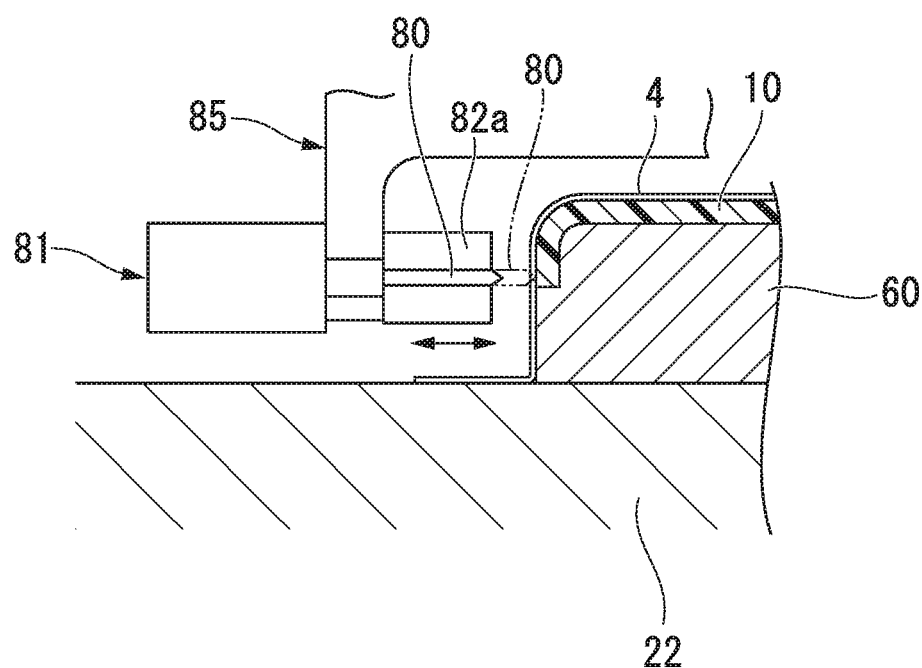
FIG. 7 is a partial cross-sectional view for describing a fourth embodiment of the forming apparatus according to the first aspect of the invention.

FIG. 7 is a diagram showing a fourth embodiment of the forming apparatus according to the first aspect of the invention.

The forming apparatus shown in FIG. 7 is different from the forming apparatus shown in FIG. 6 in that the trimming means is provided so as to be movable with respect to an apparatus for making the sheet 4 adhere to the base material 10.

In this embodiment, as the apparatus (not shown) for making the sheet 4 adhere to the base material 10, an apparatus having a configuration in which the blade 63 and the coil spring 61 biasing the base material jig 60 are excluded from the forming apparatus 1 shown in FIG. 2 is used.

As the trimming means, a side cutting device 85 is used. The side cutting device 85 includes the blade 80 and the advancing and retreating means 81 shown in FIG. 6, further includes a movement mechanism (not shown), and is provided to be movable with respect to the above-described apparatus for adhesion of the sheet 4. In addition, the blade 80 of the side cutting device 85 can also be disposed corresponding to a desirable covering state of the sheet 4 with respect to the base material 4 so as to face any of the side peripheral surface of the base material 10, the side peripheral surface of the base material jig 60, and an area between the side peripheral surface of the base material 10 and the side peripheral surface of the base material jig 60, similarly to the blade 80 shown in FIG. 6.

In a forming method by the forming apparatus provided with such trimming means, after the sheet 4 has adhered to the base material 10, as shown in FIG. 3B, the heat plate 3 is moved up first, and thus the accommodation space R of the bottom frame 2 is opened. Then, the side cutting device 85 is disposed around the base material 10 with the sheet 4 adhered thereto, by the above-described movement mechanism, as shown in FIG. 7.

Subsequently, the advancing and retreating means 81 is operated, thereby advancing the blade 80, as shown by a two-dot chain line in FIG. 7.

Then, the blade 80 cuts into the sheet 4 and comes into contact with, for example, the side peripheral surface of the base material 10. In this manner, the sheet 4 which has adhered to the side peripheral surface of the base material 10 is cut, and thus trimming on the sheet 4 is performed.

Subsequently, the blade 80 is retreated by the advancing and retreating means 81. In this manner, trimming is completed, and thus a formed product is completed. Thereafter, the side cutting device 85 is returned from above the base 22 to the initial position by the above-described movement mechanism.

Then, the completed formed product is taken out in the same manner as the first embodiment, whereby a series of forming operations are completed.

Also in such a forming apparatus and the forming method using the forming apparatus, since trimming on the sheet 4 is performed with respect to the base material 10 with the sheet 4 adhered thereto, by the trimming means (the side cutting device 85) which includes the blade 80 and the advancing and retreating means 81, in a state in which the base material 10 is not removed from the base material jig 60, it is not necessary to remove and transport the base material 10 from the base material jig 60, and therefore, the adhesion layer of the sheet 4 of an extra site extending from the base material 10 can be reliably prevented from adhering to hands, other jigs or devices, or the like.

Therefore, peeling of the sheet 4 from the base material 10 or damage to the sheet 4, as in the related art, is prevented, and thus productivity can be significantly improved.

In addition, in the forming apparatus employing the side cutting device 85 shown in FIG. 7, a configuration may also be made such that trimming is performed by moving the base material jig 60 itself to the side cutting device 85 while retaining the base material 10 with the sheet 4 adhered thereto on the base material jig 60, instead of moving the side cutting device 85 onto the base 22 by the above-described movement mechanism. At that time, the movement of the base material jig 60 itself to the side cutting device 85 may be performed by using a movement mechanism (not shown) and may also be performed by human hands.

The embodiments of the forming apparatus and the forming method according to the first aspect of the invention have been described above. However, the invention is not limited to these embodiments and various changes can be made within a scope which does not depart from the gist of the invention.

Figure 3C:
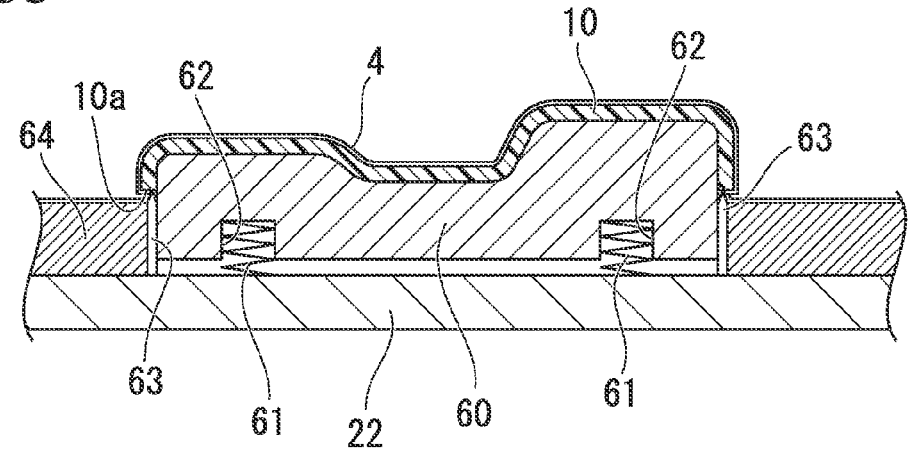
FIG. 3C is a partial cross-sectional view showing the operating procedure of the forming apparatus shown in FIG. 2.

For example, as the forming apparatus according to the first aspect of the invention, a configuration may also be made such that any of the trimming means shown in FIGS. 2 to 4, the trimming means shown in FIGS. 5A and 5B, the trimming means shown in FIG. 6, and the trimming means shown in FIG. 7 is provided in plural and the trimming means can be appropriately selected and used according to the form of the base material 10, the nature of the sheet 4, or the like.

Furthermore, in the embodiments described above, as a mechanism to make the sheet 4 adhere to the base material 10, a mechanism of a heat plate heating type is used. However, besides, for example, a mechanism of a radiation heating type may also be used.

Furthermore, in the embodiments described above, as the moving means for relatively moving the base material jig 60 and the blade 63, a configuration of moving the base material jig 60 with respect to the blade 63 is adopted. However, a configuration may also be made such that the base material jig 60 is fixed and the blade 63 is moved, and a configuration may also be made such that the two are moved together.

Furthermore, in the embodiments described above, as shown in FIG. 1, a slide type is adopted in which the bottom frame 2 of the forming apparatus can advancing and retreating, that is, slide in the front-back direction with respect to the forming position below the heat plate 3, as shown in FIG. 1. However, for example, a rotary type in which the bottom frame 2 rotates circumferentially in a plan view is also acceptable.

Furthermore, in the second embodiment shown in FIGS. 5A and 5B, as the pressing means, the pressing jig 65 and the heat plate 3 as the press mechanism are used. However, for example, the forming apparatus can also be configured such that the trimming means is provided so as to be movable with respect to the apparatus for making the sheet 4 adhere to the base material 10, as in the fourth embodiment shown in FIG. 7. In this case, the heat plate 3 is not used as the press mechanism and a press device (not shown) can be separately used.

That is, the bottom frame 2 of the forming apparatus shown in FIGS. 5A and 5B is moved to a position different from, for example, the heat plate 3 shown in FIG. 1 by the stand 6. Then, trimming can be performed by pressing the pressing jig 65, as shown in FIG. 5B, by the press device provided with a press plate equivalent to the heat plate 3 shown in FIG. 5B.

In the case of such a configuration, the bottom frame 2 is provided in plural, whereby adhesion of the sheet 4 to the base material 10 and trimming can be simultaneously performed, and thus productivity can be even more increased.

Next, a forming apparatus and a forming method according to a second aspect of the invention will be described in detail referring to the drawings.

Figure 8:
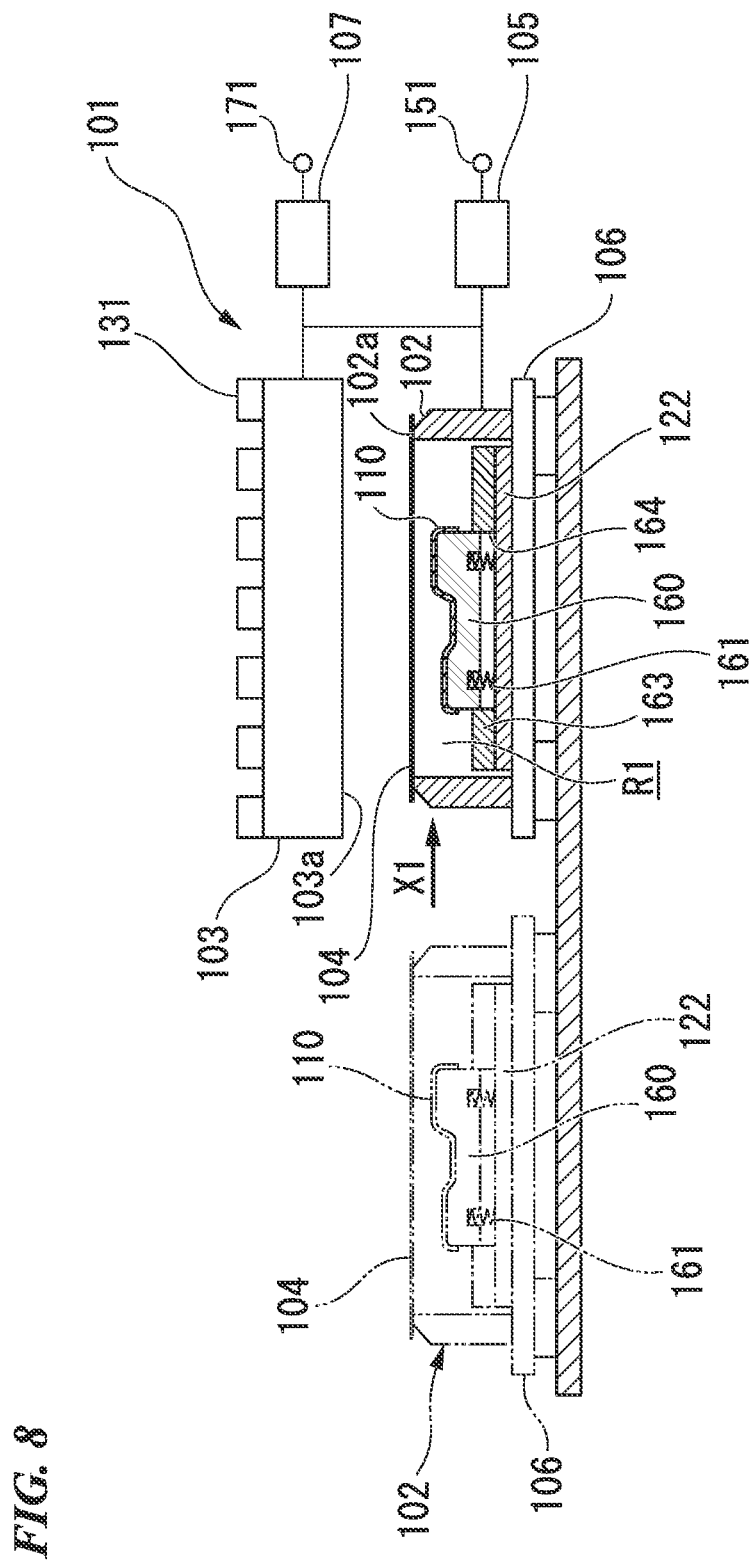
FIG. 8 is a diagram schematically showing the schematic configuration of a forming apparatus according to a second aspect of the invention.
Figure 9:
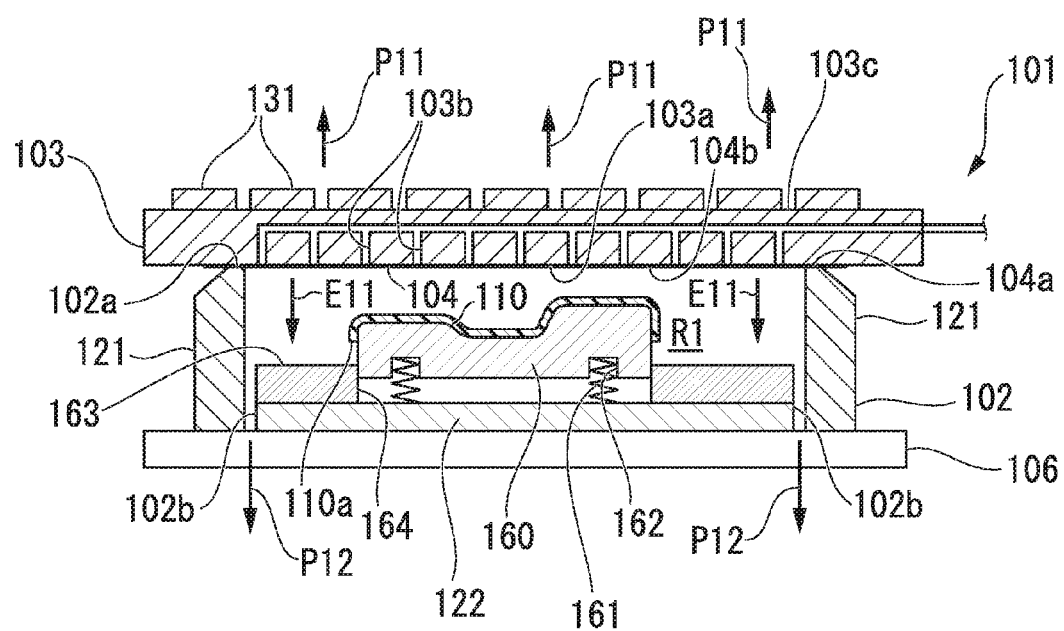
FIG. 9 is a cross-sectional side view showing the schematic configuration of a first embodiment of the forming apparatus according to the second aspect of the invention.

FIGS. 8 to 11 are diagrams showing a first embodiment of the forming apparatus according to the second aspect of the invention, and in these drawings, reference symbol 101 denotes the forming apparatus. The forming apparatus 101 is of a heat plate heating type and includes a bottom frame 102 having a space (an accommodation space R1) capable of accommodating a base material jig 160, and a heat plate 103 having a heating surface 103a capable of coming into close contact with a frame upper edge portion 102a of the bottom frame 102, as shown in FIGS. 8 and 9. Then, the forming apparatus 101 has a configuration in which a sheet 104 made of resin is disposed between the bottom frame 102 and the heat plate 103 and the sheet 104 is then thermoformed, thereby adhering to a base material 110. Here, the bottom frame 102 and the heat plate 103 are disposed up and down and the heat plate 103 is disposed on the upper side with respect to the bottom frame 102.

As shown in FIG. 9, the bottom frame 102 is made of a metallic member and forms the accommodation space R1 in which four sides are surrounded by a peripheral wall portion 121 in a plan view, and a large number of vent holes 102b communicating with the accommodation space R1 are formed on the peripheral wall portion 121 side (the outer periphery side) of a base 122 which becomes a bottom. The vent holes 102b are connected to a vacuum tank 105 provided with a vacuum pump 151 shown in FIG. 8 and a configuration is made such that during forming, the accommodation space R1 is depressurized by performing vacuum suction by driving the vacuum pump 151.

As shown in FIG. 9, it is possible to fix the sheet 104 to an upper end (the frame upper edge portion 102a) of the peripheral wall portion 121 of the bottom frame 102 so as to close an opening of the accommodation space R1.

Furthermore, the bottom frame 102 is provided on a stand 106 that can slide on a floor, and made to be able to advancing and retreating with respect to a forming position below the heat plate 103, as shown in FIG. 8.

The heat plate 103 has a flat plate shape in which the heating surface 103a has a smooth plane, and is formed in a larger shape that the bottom frame 102 in a plan view. Then, the heat plate 103 is provided to be vertically movable so as to come close to and be separated from (to be able to come into contact with and be separated from) the bottom frame 102 which is disposed at the forming position on the lower side, and configured so as to be disposed in close contact with the frame upper edge portion 102a of the bottom frame 102 in a state in which the heat plate 103 has moved downward.

In the heat plate 103, as shown in FIG. 9, a plurality of heaters 131 is provided on the upper surface 103c side and a plurality of vent holes 103b which is opened in the heating surface 103a is also provided. The vent holes 103b are connected to the vacuum tank 105 provided with the vacuum pump 151 which vacuum-suctions the heating surface 103a side, and a pressurizing tank 107 which stores air compressed by a compressor 171, as shown in FIG. 8. That is, depressurization loss can be reduced by providing the vacuum tank 105.

With such a configuration, during thermoforming, a configuration is made in which it is possible to perform vacuum suction from the bottom frame 102 by opening the vacuum tank 105 maintained in a vacuum state or to perform pressurization toward the accommodation space R1 from the heating surface 103a by supplying compressed air from the pressurizing tank 107.

In addition, the degree of vacuum may be increased by directly performing suction by drive of the vacuum pump 151 without providing the vacuum tank 105.

Figure 10A:
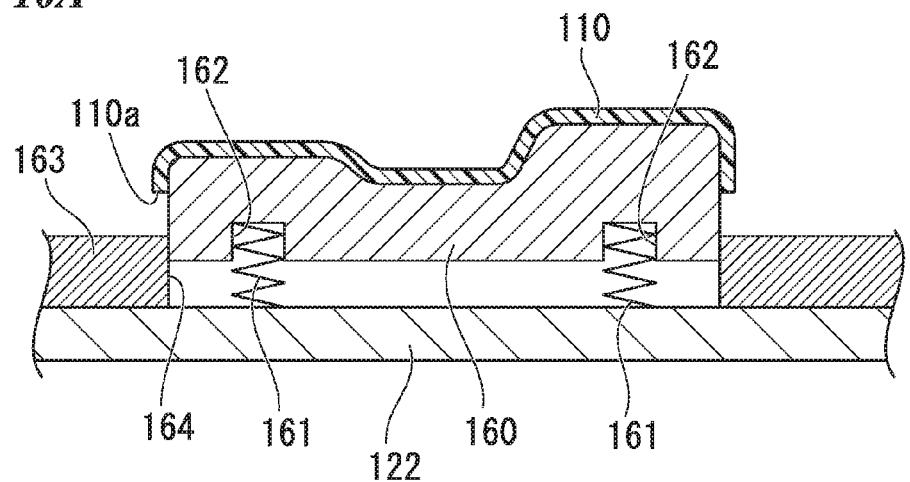
FIG. 10A is a partial cross-sectional view showing the operating procedure of the forming apparatus shown in FIG. 9.

As shown in FIG. 9, the base material jig 160 is a member made of metal or the like disposed on the base 122 and is made so as to deposit and retain the base material 110 made of resin or the like on an upper portion thereof. Furthermore, the base material jig 160 is formed such that the shape thereof in a plan view is slightly small compared to the base material 110, as shown in FIG. 10A. Therefore, the base material 110 is retained on the base material jig 160 in a state in which an outer peripheral portion thereof extends further to the outside than the side peripheral surface of the base material jig 160 and covers an upper portion of the side peripheral surface of the base material jig 160. That is, the base material jig 160 is formed and disposed such that the side peripheral surface thereof is located further to the inside than the outer peripheral portion of the base material 110.

Furthermore, in this embodiment, the base material jig 160 is configured so as to be able to move up and down with respect to the base 122, that is, be able to move between a state of coming into contact with or being close to the upper surface of the base 122 and a state of being sufficiently separated from the upper surface of the base 122. Specifically, on the bottom surface side of the base material jig 160, a coil spring 161 as biasing means is provided in plural. Each of the coil springs 61 is disposed such that one end side is accommodated in each of concave accommodation portions 162 formed and disposed at appropriate intervals at an outer peripheral portion of a bottom surface of the base material jig 160 and the other end is disposed in contact with the upper surface of the base 122. Due to such a configuration, the base material jig 160 is biased in a direction away from the upper surface of the base 122 by the coil springs 161, and therefore, at a normal time, that is, at the time of non-pressing, the base material jig 160 is in a state of floating at a predetermined distance from the base 122, as shown in FIGS. 9 and 10A.

Furthermore, in this embodiment, a configuration is made such that the compressed air is introduced into the accommodation space R1 by the pressurizing tank 107 provided with the compressor 171, whereby the base material 110 is retained on the base material jig 160, and in a state in which the sheet 104 has covered and adhered to the base material 110, as will be described later, the base material 110 is pressed by the introduced compressed air, thereby moving down to the base 122 side along with the base material jig 160. In this embodiment, air pressure of the compressed air by the pressurizing tank 107 becomes pressing means and configures moving means along with the biasing means (the coil spring 61).

Furthermore, as shown in FIG. 10A, in this embodiment, a pressing section 163 is disposed on and fixed to the base 122 so as to surround the base material jig 160. The pressing section 163 has an annular shape or an approximately annular shape with an upper surface set to be a pressing surface, and in the inside thereof, an accommodation section 164 which is configured by a through-hole or a concave portion having a shape corresponding to the shape in a plan view of the base material jig 160 is formed. The base material jig 160 is accommodated in the accommodation section 164, whereby the pressing section 163 is disposed outside the side peripheral surface of the base material jig 160 in a state of being close to the side peripheral surface of the base material jig 160. The pressing section 163 is disposed so as not to close the vent holes 102b of the bottom frame 102.

In addition, in this embodiment, the pressing section 163 is formed separately from the base 122 and disposed on and fixed to the base 122. However, the pressing section 163 may be formed integrally with the base 122. That is, a configuration may be made such that a concave portion which accommodates the base material jig 160 is directly formed in the base 122 and set to be the accommodation section 164 and the outside thereof functions as the pressing section 163.

With such a configuration, the upper surface of the pressing section 163, that is, the pressing surface is disposed to face the bottom surface 110a of an outer peripheral portion of the base material 110 extending further to the outside than the side peripheral surface of the base material jig 160. In addition, since at a normal time (the time of non-pressing), the base material jig 160 is in a state of floating at a predetermined distance from the base 122, at a normal time (the time of non-pressing), the pressing surface of the pressing section 163 is in a state of being separated from the bottom surface 110a of the base material 110.

Furthermore, due to such a configuration, the moving means moves the base material 110 on the base material jig 160 toward the pressing surface of the pressing section 163, thereby bringing the bottom surface 110a of the base material 110 into contact with the pressing surface (the pressing section 163) with the sheet 104 interposed therebetween and performing pressure-sticking, as will be described later.

The sheet 104 is a known multilayer sheet having a printed layer, a protective film or a carrier film provided on the surface of the printed layer, and an adhesion layer provided on the back face side of the printed layer. An outer peripheral portion 104a of the sheet 104 is fixed in a horizontal state to the frame upper edge portion 102a of the bottom frame 102 by fixing means (not shown), as shown in FIG. 9. The base material 110 side (the lower surface 104b side) of the sheet 104 is the adhesion layer, and in a state in which the sheet 104 has been fixed to the bottom frame 102, a gap is formed between the lower surface 104b and the base material 110. In addition, if the size of the gap between the base material 110 and the heat plate 103 (the sheet 104) is, for example, approximately 5 mm, forming is possible, and a concave portion (the accommodation space R1) of the bottom frame 102 can be minimized by making the gap small.

Then, the forming apparatus 101 has a configuration having forming operation means (not shown) for making suction and heating operations by the heat plate 103 and a depressurization operation of the accommodation space R1 below the sheet 104 be simultaneously performed in a state in which the bottom frame 102 and the heat plate 103 come into close contact with each other with the sheet 104 interposed therebetween, stopping the suction operation by the heat plate 103 after a predetermined time from the start of these operations, and opening the gap between the heat plate 103 and the sheet 104 to the atmosphere or pressurizing the gap between the heat plate 103 and the sheet 104. That is, in the forming apparatus 101, adhesion means for making the sheet 104 adhere to the base material 110 retained on the base material jig 160 is configured by depressurization means which is configured by the bottom frame 102, the heat plate 103, and the vacuum tank 105, pressurizing means which is configured by the pressuring tank 107, or the like. In addition, the forming operation means refers to, for example, means provided with a control circuit for performing the above-described operations.

Next, a forming method by the forming apparatus 101 will be described.

First, as shown in FIGS. 8 and 10A, the pressing section 163 is disposed on and fixed to the base 122 of the bottom frame 102, the base material jig 160 is disposed in the accommodation section 164, and the base material 110 is set on the base material jig 160, thereby making the base material 110 be deposited and retained on the base material jig 160 (a retaining process). In addition, in this state, the base material jig 160 is biased upward by the action of the coil springs 161, thereby being in a state of floating above the base 122.

Subsequently, the sheet 104 is placed on the frame upper edge portion 102a of the bottom frame 102 and brought into close contact with the bottom frame 102. That is, the sheet 104 is fixed to the frame upper edge portion 102a of the peripheral wall portion 121 of the bottom frame 102 so as to close the opening of the accommodation space R1.

Then, the bottom frame 102 with the base material 110 set thereon is moved to the forming position below the heat plate 103 (in a direction of arrow X1 in FIG. 8).

Subsequently, as shown in FIG. 9, the heat plate 103 is moved downward, thereby bringing the outer peripheral portion of the heating surface 103a into close contact with the frame upper edge portion 102a of the bottom frame 102 with the sheet 104 interposed therebetween. At this time, the sheet 104 is disposed in a state in which the entire surface of the upper surface is almost in contact with the heating surface 103a of the heat plate 103, and enters a state in which the outer peripheral portion 104a thereof is pinched by the bottom frame 102 and the heat plate 103.

Subsequently, the gap between the heat plate 103 and the sheet 104 is depressurized, and thus the sheet is suctioned and stuck to the heating surface 103a and then heated. Furthermore, simultaneously with the heating process, the accommodation space R1 below the sheet 104 is depressurized.

Specifically, the heat plate 103 is heated by the heaters 131 and also the vacuum tank 105 is opened, thereby vacuum-suctioning the sheet 104 through the vent holes 103b in a direction (a direction of arrow P11 in FIG. 9) in which the sheet 104 moves toward the heating surface 103a of the heat plate 103. In this manner, the sheet 104 is suctioned and stuck to the heating surface 103a and the suctioned and stuck sheet 104 is heated.

Figure 11:
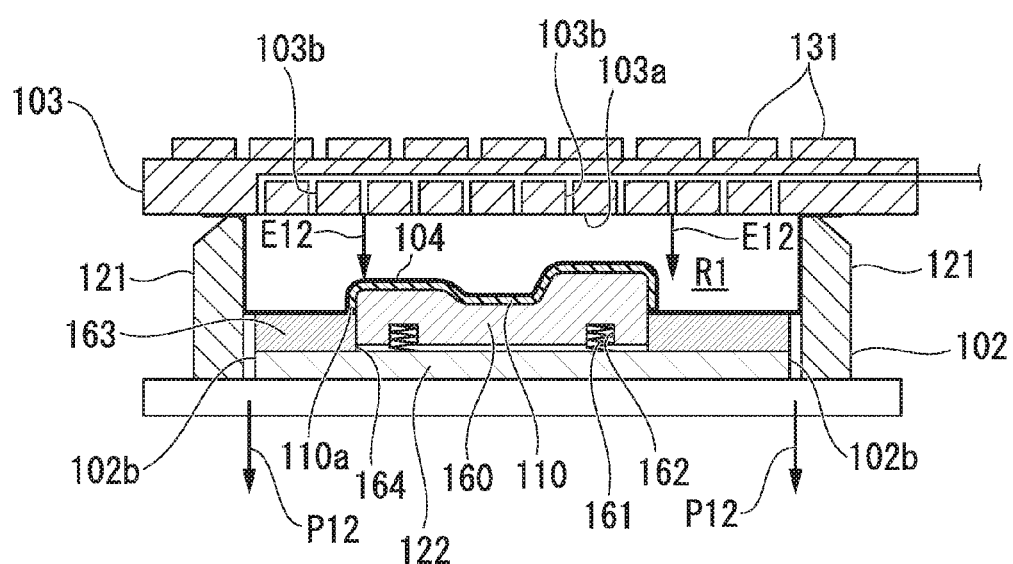
FIG. 11 is a cross-sectional side view showing the operating procedure of a forming method following FIG. 9, of the forming apparatus shown in FIG. 9.

Furthermore, during the heating, in the bottom frame 102, as shown in FIG. 11, the vacuum tank 105 is opened, thereby performing vacuum suction through the vent holes 103b in a direction (a direction of arrow P12) in which the sheet 104 moves downward. In this manner, air in the accommodation space R1 below the sheet 104 is suctioned in a direction of arrow E11 in FIG. 9, and thus the accommodation space R1 is depressurized, thereby entering a state of the high degree of vacuum.

Subsequently, the suction operation of the sheet 104 is stopped in a state in which the above-described depressurization operation of the accommodation space R1 is maintained, and the gap between the heat plate 103 and the sheet 104 is opened to the atmosphere or pressurized toward the bottom frame 102.

Specifically, the sheet 104 suctioned and stuck to the heat plate 103 is heated to a predetermined temperature, and after the lapse of a predetermined period of time, vacuum suction on the heat plate 103 side is stopped, and thus the suction operation is stopped. In this manner, since the gap between the heat plate 103 and the sheet 104 is opened to the atmosphere, a difference in pressure occurs between upper and lower spaces across the sheet 104. For this reason, as shown in FIG. 11, the sheet 104 softened by heating is separated from the heating surface 103a of the heat plate 103, moves in a direction of arrow E12 toward the base 122 (the base material 110) of the bottom frame 102 below the sheet 104, and is pressed against the surface of the base material 110, thereby covering and adhering to the surface of the base material 110 (an adhesion process).

Figure 10B:
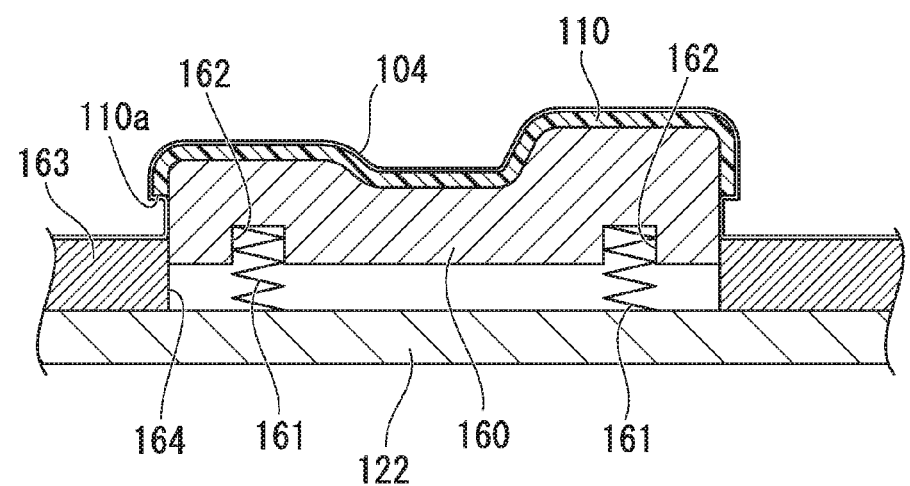
FIG. 10B is a partial cross-sectional view showing the operating procedure of the forming apparatus shown in FIG. 9.

At that time, since the accommodation space R1 is uniformly depressurized, the sheet 104 is drawn from the outer peripheral surface of the base material 110 onto the bottom surface 110a of the outer peripheral portion of the base material 110 and a portion of the side peripheral surface of the base material jig 160, thereby covering these portions, and further covers and adheres to the upper surface of the pressing section 162, as shown in FIG. 10B. However, the width of the bottom surface 110a of the outer peripheral portion of the base material 110 is small, and thus an adhesion area is small, and the sheet 104 is bent toward the bottom surface 110a from the side peripheral surface of the base material 110 and further bent toward the side peripheral surface of the base material jig 160 from the bottom surface 110a. Therefore, in this state, the sheet 104 is not pressed and stuck to the bottom surface 110a. That is, in this state, sufficient adhesive strength of the sheet 104 to the bottom surface 110a is not obtained. Similarly, the sheet 104 does not adhere even to the side peripheral surface of the base material jig 160 with sufficient adhesive strength.

Here, even if the sheet 104 adheres to the base material 110 in this manner, since in this state, pressure enough to move the base material jig 160 down is not applied to the base material jig 160, the base material jig 160 does not move down toward the base 122 and is maintained in a floating state by the coil springs 161.

In addition, when the gap between the heat plate 103 and the sheet 104 is opened to the atmosphere, the accommodation space R1 may be pressurized by ejecting the compressed air from the vent holes 103b of the heat plate 103 by performing switching from the vacuum tank 105 to the pressurizing tank 107 shown in FIG. 8. However, applied pressure at that time is set to be pressure sufficiently smaller than the biasing force of the coil spring 161 which biases the base material jig 160, such that the base material jig 160 does not move down.

Thereafter, the compressed air having pressure set in advance is introduced from the pressurizing tank 107 shown in FIG. 8 through the vent holes 103b of the heat plate 103 into the accommodation space R1. The pressure (the pressure set in advance) of the compressed air which is introduced, that is, air pressure is set to be pressure sufficiently larger than pressure when opening the gap between heat plate 103 and the sheet 104 to the atmosphere previously or performing pressurization toward the bottom frame 102, that is, pressure larger than the biasing force of the coil spring 161 which biases the base material jig 160.

Figure 10C:
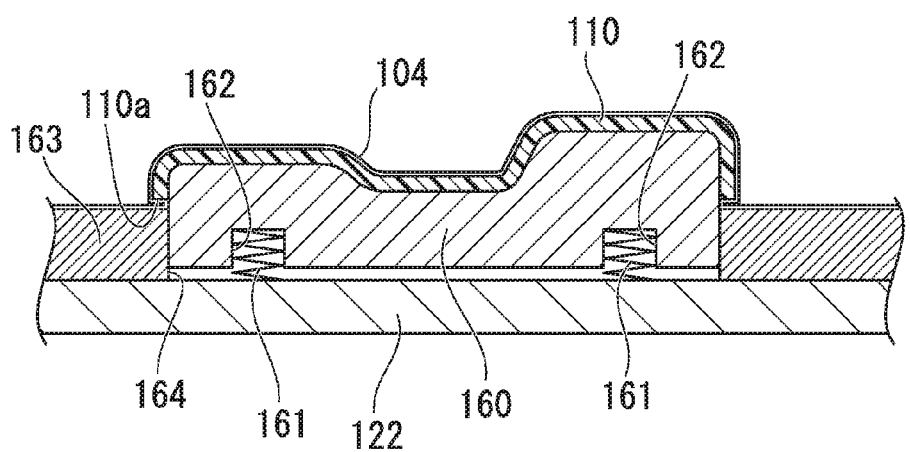
FIG. 10C is a partial cross-sectional view showing the operating procedure of the forming apparatus shown in FIG. 9.

In this manner, if the compressed air having pressure set in advance is introduced from the pressurizing tank 107 into the accommodation space R1, the compressed air presses the sheet 104 which is located on the entire face on the opening side of the accommodation space R1, thereby pressing the base material jig 160 along with the base material 110 through the sheet 104. Then, since the pressure of the compressed air (the air pressure) is pressure larger than the biasing force of the coil spring 161, as described above, the base material 110 moves down while still in a state of being retained on the base material jig 160, as shown in FIG. 10C.

In this manner, if the base material 110 is pressed, thereby moving down, and at the same time, the base material jig 160 is also pressed, thereby moving down, since the pressing section 163 is disposed at the base 122 so as to face the bottom surface 110a of the outer peripheral portion of the base material 110, the pressing section 163 relatively moves toward the bottom surface 110a of the base material 110, thereby coming into contact with the sheet 104 which has adhered onto the bottom surface 110a and pressing the sheet 104 and performing pressure-sticking. That is, the sheet 104 is pressure-stuck to the bottom surface 110a by sandwiching the sheet 104 between the bottom surface 110a and the pressing surface (the upper surface) of the pressing section 163 and crushing the sheet 104 (a pressure-sticking process).

Then, after this state is maintained for a predetermined period of time, the introduction of the compressed air from the pressurizing tank 107 is stopped and the inside of the accommodation space R1 is returned to atmospheric pressure again. Then, due to opening from a pressurization state (a pressing state), the base material jig 160 moves up again by the action of the coil springs 161, thereby entering a state of floating from the base 122. In this manner, the pressing section 163 is separated from the bottom surface 110a of the base material 110 and the pressure-sticking of the sheet 104 is to the bottom surface 110a is completed.

If the adhesion process and the pressure-sticking process are finished in this manner, the heat plate 103 is moved upward and the bottom frame 102 is then laterally moved along with the stand 106 shown in FIG. 8, thereby being moved from a position below the heat plate 103. Then, the completed formed product (the base material 110 covered with the sheet 104 and with the sheet 104 adhered thereto) is removed from the base material jig 160 and taken out of the accommodation space R1, whereby a series of forming operations by the forming apparatus 101 of this embodiment are finished. In addition, the obtained formed product is sent to a trimming process and trimming treatment of the sheet 104 is performed, whereby a final formed product (a finished product) is made.

In the forming apparatus 101 and a forming method using the forming apparatus 101, the adhesive strength of the sheet 104 adhering to the bottom surface 110a can be increased by pressure-sticking the sheet 104 to the bottom surface 110a of the outer peripheral portion of the base material 110 by the pressing section 163. Therefore, peeling of the sheet 104 is prevented, and thus a defect due to peeling of the sheet 104 can be prevented.

Furthermore, since the pressure-sticking of the sheet 104 can be performed without removing the base material 110 from the base material jig 160, and thus the adhesion layer of the sheet 104 of an extra site extending from the base material 110 is prevented from adhering to hands, other jigs or devices, or the like, significant impair of productivity due to adhesion of the adhesion layer of the sheet 104 of the extra site to hands, other jigs or devices, or the like does not occur, and therefore, improvement in productivity can be attained.

Furthermore, since the moving means for relatively moving the pressing section 163 to the bottom surface 110a of the outer peripheral portion of the base material 110 is configured by the biasing means which is configured by the coil spring 161 and the pressing means which is configured by the air pressure by the pressurizing tank 107, the sheet 104 is easily and reliably pressure-stuck to the bottom surface 110a of the outer peripheral portion of the base material 110 by moving the base material 110 toward the pressing section 163 by pressing the base material 110 against the biasing mean by the pressing means.

In addition, in this embodiment, the coil spring 161 is used as the biasing means. However, instead of the coil spring 161, an elastic body such as rubber may be used.

Furthermore, in this embodiment, the moving means is configured to include the biasing means and the pressing means. However, instead of such moving means, moving means capable of moving the base material jig 160 up and down may be used.

As this moving means, for example, a known air cylinder mechanism capable of moving the base material jig 160 up and down can be used. However, in this case, it is necessary to provide a mechanism, for example, a fixing mechanism by vacuum suction or the like, which fixes the base material 110 to the base material jig 160 such that when the base material jig 160 is moved down by the air cylinder mechanism, the base material 110 is also moved down along with the base material jig 160.

Figure 12A:
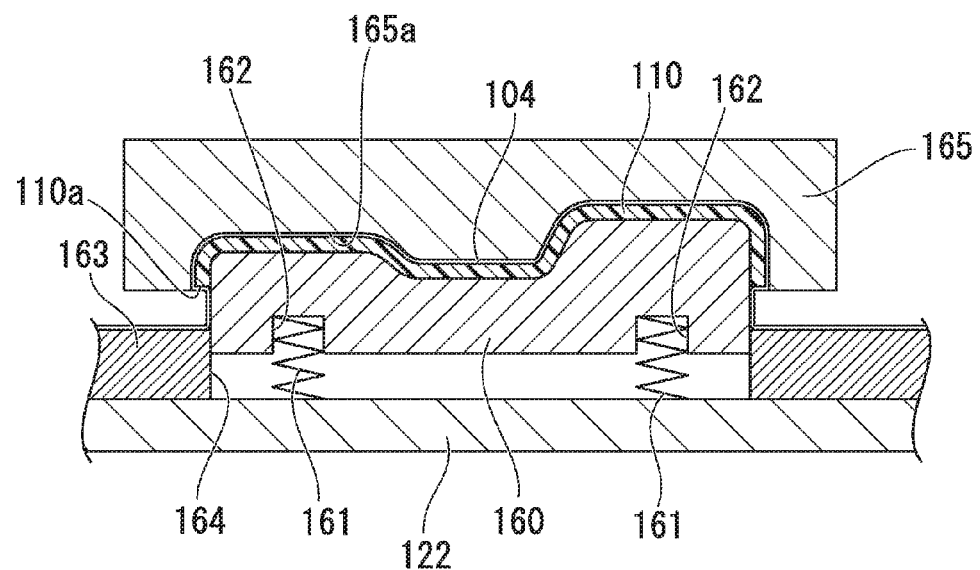
FIG. 12A is a partial cross-sectional view showing the schematic configuration and the operating procedure of a second embodiment of the forming apparatus according to the second aspect of the invention.
Figure 12B:
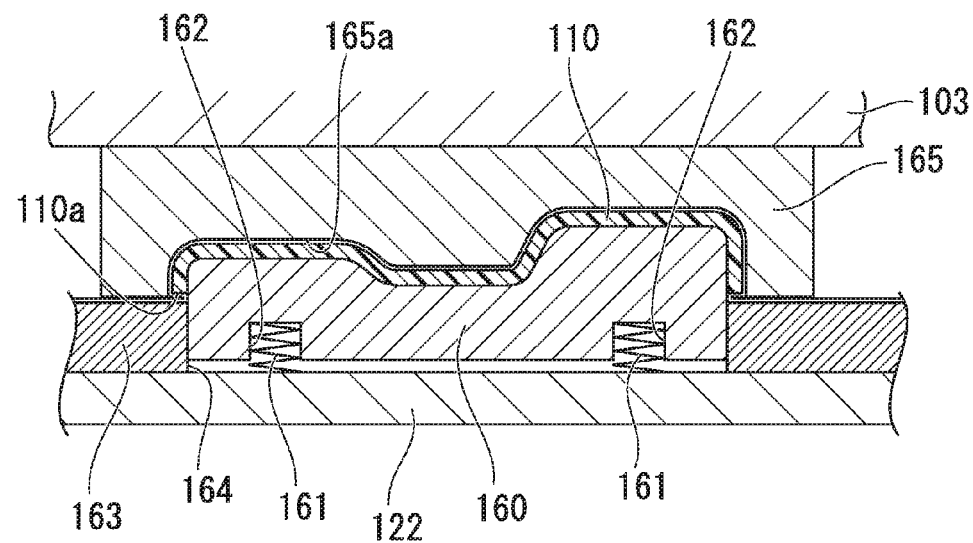
FIG. 12B is a partial cross-sectional view showing the schematic configuration and the operating procedure of the second embodiment of the forming apparatus according to the second aspect of the invention.

FIGS. 12A and 12B are diagrams showing a second embodiment of the forming apparatus according to the second aspect of the invention.

The forming apparatus shown in FIGS. 12A and 12B is different from the forming apparatus 101 shown in FIGS. 8 to 11 in that instead of using the air pressure by the pressurizing tank 107 as the pressing means in the moving means, a pressing jig 165 and the heat plate 103 as a press mechanism are used.

That is, in this embodiment, the pressing jig 165 made of resin, metal, or the like is provided separately from the heat plate 103 or the bottom frame 102. The pressing jig 165 has a concave portion 165a which is engaged with the outer surface of the base material 110 so as to nearly cover the outer surface of the base material 110, and is made so as to be moved onto the base material 110 on the base material jig 160 by a movement mechanism (not shown) and deposited on the base material 110. Furthermore, the pressing jig 165 may be made so as to be deposited on the base material 110 by human hands without being configured so as to be automatically deposited on the base material 110 by the movement mechanism.

In a forming method by the forming apparatus provided with the pressing jig 165, after the sheet 104 has adhered to the base material 110, as shown in FIG. 10B, the heat plate 103 is moved up first, and thus the accommodation space R1 of the bottom frame 102 is opened. Then, the pressing jig 165 is deposited on the base material 110 with the sheet 104 adhered thereto, by the above-described movement mechanism or human hands, as shown in FIG. 12A.

Subsequently, the heat plate 103 is moved down again so as to function as the press mechanism, as shown in FIG. 12B, and thus the pressing jig 165 is pressurized and moved down. Then, since a pressing force which is applied toward the base material 110 through the pressing jig 165, that is, applied pressure by the heat plate 103 becomes pressure larger than the biasing force of the coil spring 161, the base material jig 160 moves down while still in a state of retaining the base material 110.

In this manner, the base material jig 160 moves down and at the same time, the base material 110 is also pressed, thereby moving down, whereby the pressing section 163 relatively moves toward the bottom surface 110a of the base material 110 and performing pressure-sticking of the sheet 104 which has adhered onto the bottom surface 110a, in the same manner as the first embodiment of the second aspect. That is, the sheet 104 is pressure-stuck to the bottom surface 110a by sandwiching the sheet 104 between the bottom surface 110a and the pressing surface (the upper surface) of the pressing section 163 and crushing the sheet 104.

Then, after this state is maintained for a predetermined period of time, the heat plate 103 is moved up again. Then, due to opening from a pressing state, the base material jig 160 moves up again by the action of the coil springs 161, thereby entering a state of floating from the base 122. In this manner, the pressing section 163 is separated from the bottom surface 110a of the base material 110 and the pressure-sticking of the sheet 104 to the bottom surface 110a is completed.

If the adhesion process and the pressure-sticking process are finished in this manner, the pressing jig 165 is removed from above the base material 110 and then, the formed product (the base material 110 covered with the sheet 104 and with the sheet 104 adhered thereto) is removed from the base material jig 160 and then taken out of the accommodation space R1, in the same manner as the first embodiment of the second aspect, whereby a series of forming operations are finished. Then, a final formed product (a finished product) is made by performing trimming treatment on the obtained formed product.

Also in the forming apparatus 101 and a forming method using the forming apparatus 101, the adhesive strength of the sheet 104 adhering to the bottom surface 110a can be increased by pressure-sticking the sheet 104 to the bottom surface 110a of the outer peripheral portion of the base material 110 by the pressing section 163. Therefore, peeling of the sheet 104 is prevented, and thus a defect due to peeling of the sheet 104 can be prevented.

Furthermore, since the pressure-sticking of the sheet 104 can be performed without removing the base material 110 from the base material jig 160, and thus the adhesion layer of the sheet 104 of an extra site extending from the base material 110 is prevented from adhering to hands, other jigs or devices, or the like, significant impair of productivity due to adhesion of the adhesion layer of the sheet 104 of the extra site to hands, other jigs or devices, or the like does not occur, and therefore, improvement in productivity can be attained.

Figure 13A:
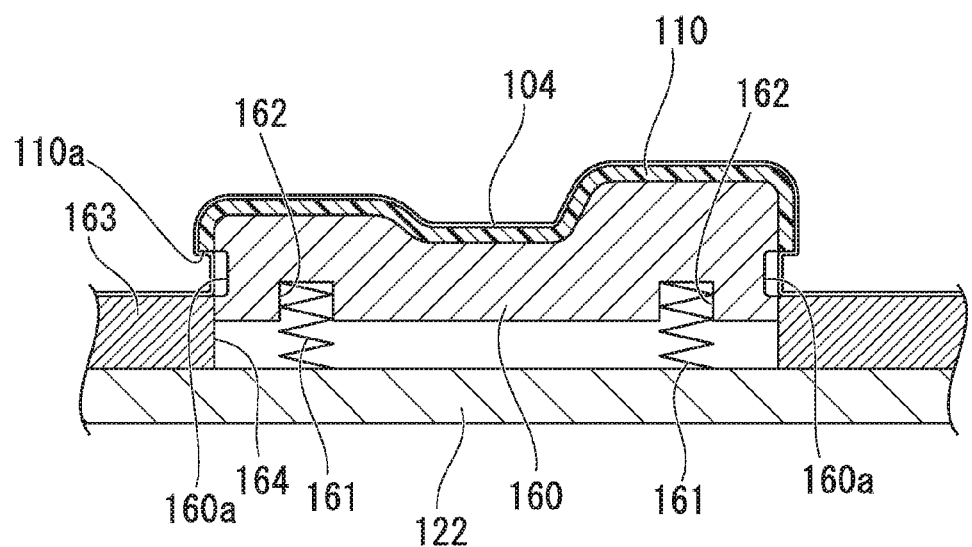
FIG. 13A is a partial cross-sectional view showing the schematic configuration and the operating procedure of a third embodiment of the forming apparatus according to the second aspect of the invention.
Figure 13B:
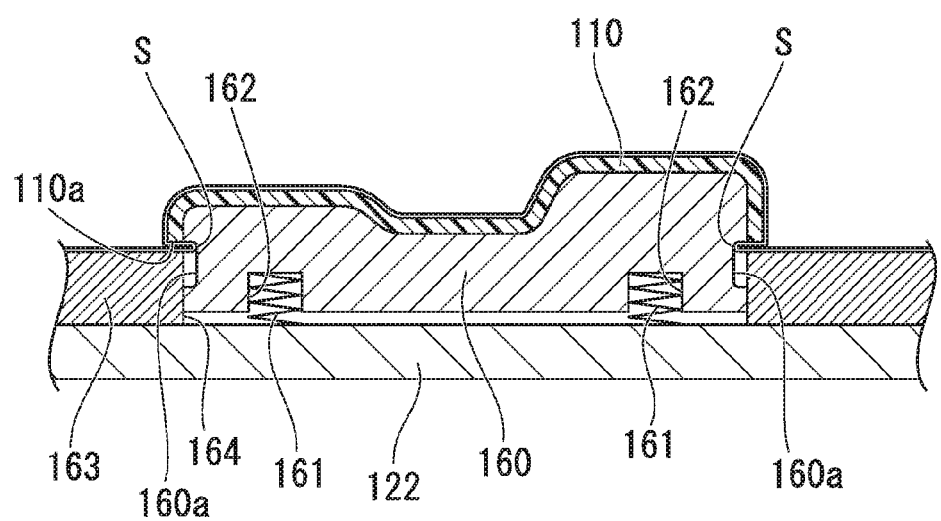
FIG. 13B is a partial cross-sectional view showing the schematic configuration and the operating procedure of the third embodiment of the forming apparatus according to the second aspect of the invention.

FIGS. 13A and 13B are diagrams showing a third embodiment of the forming apparatus according to the second aspect of the invention.

The forming apparatus shown in FIGS. 13A and 13B is different from the forming apparatus 101 shown in FIGS. 8 to 11 in that as the base material jig 160, a base material jig with a concave portion 160a formed therein is used.

That is, as shown in FIG. 13A, in the base material jig 160 of this embodiment, the concave portion 160a is formed further to the base 122 than the bottom surface 110a of the outer peripheral portion of the base material 110 in the side peripheral surface of the base material jig 160. The concave portion 160a is formed in a groove shape in the entire circumference of the side peripheral surface of the base material jig 160 and formed to be cut out in a predetermined width (a predetermined height) and to a predetermined depth from nearly the same height position as the bottom surface 110a of the deposited base material 110 to the lower side (the pressing section 163 side). Here, the width (a predetermined width) or the depth (a predetermined depth) of the concave portion 160a is the extent that a portion of the sheet 104 can escape and be accommodated therein at the time of the pressure-sticking process, as will be described later, and is designed by being sought for by an experiment or simulation in advance.

In a forming method by the forming apparatus employing the base material jig 160 having the concave portion 160a, after the sheet 104 has adhered to the base material 110, as shown in FIG. 13A, the base material 110 is pressed by the pressing means by the air pressure of the pressurizing tank 107, and thus the base material 160 is moved down in a state of retaining the base material 110.

Then, similarly to the first embodiment of the second aspect, the pressing section 163 relatively moves toward the bottom surface 110a of the base material 110, thereby coming into contact with the sheet 104 which has adhered onto the bottom surface 110a and pressing the sheet 104 and performing pressure-sticking, as shown in FIG. 13B. That is, the sheet 104 is pressure-stuck to the bottom surface 110a by sandwiching the sheet 104 between the bottom surface 110a and the pressing surface (the upper surface) of the pressing section 163 and crushing the sheet 104.

At that time, since a portion of the sheet 104 is located between the bottom surface 110a of the base material 110 and the pressing surface (the upper surface) of the pressing section 163, the portion extends toward the base material jig 160 and is folded back due to the pressure-sticking, thereby being turned into a folded portion S. In the case of the first embodiment or the second embodiment of the second aspect, the folded portion S enters a state in which it extends from the bottom surface 110a of the base material 110 when the base material 110 has been removed from the base material jig 160 after the pressure-sticking process. Therefore, the folded portion S does not remain in a finished product by being removed in a subsequent trimming process.

However, if the folded portion S is present between the bottom surface 110a of the base material 110 and the pressing surface of the pressing section 163 at the time of the pressure-sticking, the sheet 104 non-uniformly comes into contact with the bottom surface 110a of the base material 110 or a slight difference in pressure occurs between a position where the folded portion is present and a position where the folded portion is not present, and thus a concern that unevenness may occur in adhesion of the sheet 104 to the bottom surface 110a of the base material 110 cannot be denied.

Therefore, in this embodiment, a configuration is made such that the concave portion 160a is formed in the base material jig 160, whereby the folded portion S described above escapes into the concave portion 160a and is accommodated therein at the time of the pressure-sticking, as shown in FIG. 13B.

Therefore, in the forming apparatus of this embodiment and a forming method using the forming apparatus, at the time of the pressure-sticking, the folded portion S described above escapes into the concave portion 160a, whereby the sheet 104 can uniformly come into contact with the bottom surface 110a of the base material 110 without unevenness and be pressure-stuck to the bottom surface 110a of the base material 110 with uniform pressure. Accordingly, the adhesive strength of the sheet 104 adhering to the bottom surface 110a of the base material 110 is further increased and peeling of the sheet is prevented, and thus a defect due to peeling of the sheet 104 can be more reliably prevented.

In addition, also in this embodiment, similarly to the case of the first embodiment or the second embodiment of the second aspect, when the base material 110 has been removed from the base material jig 160 after the pressure-sticking process, the folded portion S described above enters a state of extending from the bottom surface 110a of the base material 110. Therefore, the folded portion S is removed from a finished product and does not remain by being removed in a subsequent trimming process.

Furthermore, in this embodiment, a case has been described in which the base material jig 160 with the concave portion 160a formed therein is applied to the forming apparatus 101 and the forming method of the first embodiment of the second aspect. However, it can also be applied to the forming apparatus and the forming method of the second embodiment of the second aspect.

Figure 14A:
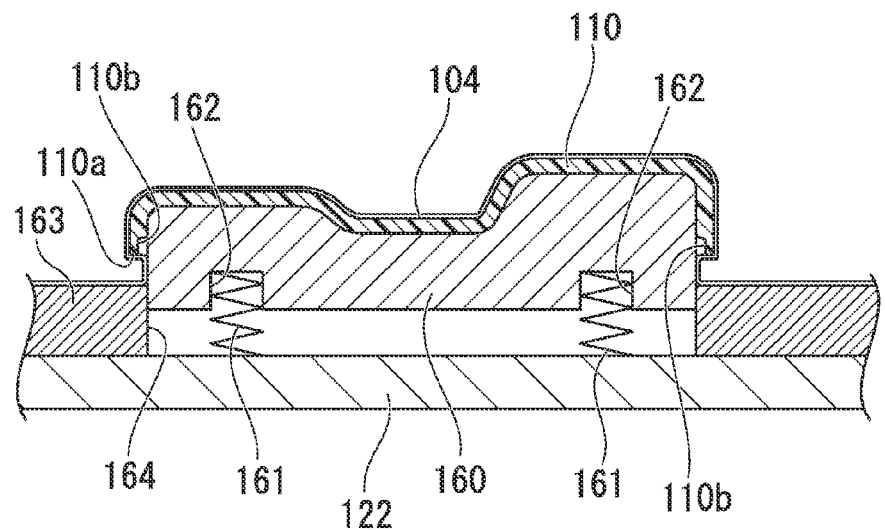
FIG. 14A is a partial cross-sectional view showing the operating procedure of a fourth embodiment of a forming method according to the second aspect of the invention.
Figure 14B:
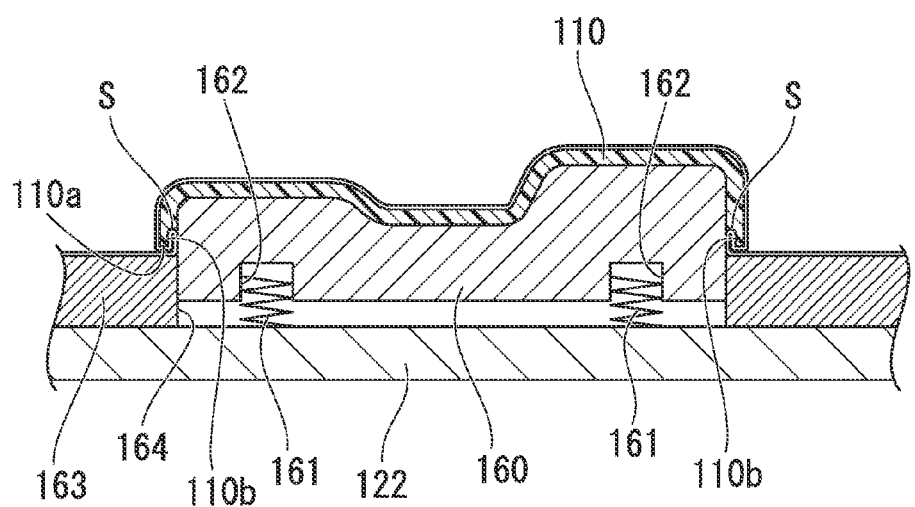
FIG. 14B is a partial cross-sectional view showing the operating procedure of the fourth embodiment of the forming method according to the second aspect of the invention.

FIGS. 14A and 14B are diagrams showing a fourth embodiment of the forming apparatus according to the second aspect of the invention.

The forming method shown in FIGS. 14A and 14B is different from the forming apparatus 101 shown in FIGS. 8 to 11 in that as the base material 110, a base material with a concave portion formed therein is used.

That is, as shown in FIG. 14A, in the base material 110 of this embodiment, a concave step portion (a concave portion) 110b is formed on the base material jig 160 side, that is, at an inner peripheral edge portion of the bottom surface 110a of the outer peripheral portion extending further to the outside than the side peripheral surface of the base material jig 160. The step portion 110b is annularly formed in the entire circumference of an inner peripheral edge of the bottom surface 110a of the base material 110 and formed to be cut out in a predetermined width and to a predetermined depth from the bottom surface 110a of the base material 110 to the upper side. Here, the width (a predetermined width) or the depth (a predetermined depth) of the step portion 110b is the extent that a portion of the sheet 104 can escape and be accommodated therein at the time of the pressure-sticking process and is designed by being sought for by an experiment or simulation in advance, similarly to the concave portion 160a of the previous embodiment of the second aspect.

In a forming method using the base material 110 having the step portion 110b, after the sheet 104 has adhered to the base material 110, as shown in FIG. 14A, the base material 110 is pressed by the pressing means by, for example, the air pressure of the pressurizing tank 107, and thus the base material 160 is moved down in a state of retaining the base material 110.

Then, similarly to the first embodiment of the second aspect, the pressing section 163 relatively moves toward the bottom surface 110a of the base material 110, thereby coming into contact with the sheet 104 which has adhered onto the bottom surface 110a and pressing the sheet 104 and performing pressure-sticking, as shown in FIG. 14B. That is, the sheet 104 is pressure-stuck to the bottom surface 110a by sandwiching the sheet 104 between the bottom surface 110a and the pressing surface (the upper surface) of the pressing section 163 and crushing the sheet 104.

At that time, since a portion of the sheet 104 is located between the bottom surface 110a of the base material 110 and the pressing surface (the upper surface) of the pressing section 163, the portion extends toward the base material jig 160 and is folded back due to the pressure-sticking, thereby being turned into the folded portion S.

Therefore, in this embodiment, a configuration is made such that the step portion 110b is formed in the base material 110, whereby the folded portion S described above escapes into the step portion 110b and is accommodated therein at the time of the pressure-sticking, as shown in FIG. 14B.

Therefore, also in the forming method of this embodiment, similarly to the third embodiment of the second aspect, at the time of the pressure-sticking, the folded portion S described above escapes into the step portion 110b, whereby the sheet 104 can uniformly come into contact with the bottom surface 110a of the base material 110 without unevenness and be pressure-stuck to the bottom surface 110a of the base material 110 with uniform pressure. Accordingly, the adhesive strength of the sheet 104 adhering to the bottom surface 110a of the base material 110 is further increased and peeling of the sheet is prevented, and thus a defect due to peeling of the sheet 104 can be more reliably prevented.

In addition, also in this embodiment, similarly to the case of the first embodiment to the third embodiment of the second aspect, when the base material 110 has been removed from the base material jig 160 after the pressure-sticking process, the folded portion S described above enters a state of extending from the bottom surface 110a of the base material 110. Therefore, the folded portion S is removed from a finished product and does not remain by being removed in a subsequent trimming process.

Furthermore, in this embodiment, a case has been described in which the base material 110 with the step portion 110b formed therein is applied to the forming method using the forming apparatus 101 of the first embodiment of the second aspect. However, it can also be applied to the forming method of the second embodiment of the second aspect.

The embodiments of the forming apparatus and the forming method according to the second aspect of the invention have been described above. However, the invention is not limited to these embodiments and various changes can be made within a scope which does not depart from the gist of the invention.

For example, in the above-described embodiments of the second aspect, as a mechanism to make the sheet 104 adhere to the base material 110, a mechanism of a heat plate heating type is used. However, besides, for example, a mechanism of a radiation heating type may be used.

Furthermore, in the above-described embodiments of the second aspect, as the moving means for relatively moving the base material 110 and the pressing section 163, a configuration of moving the base material 110 (the base material jig 160) with respect to the pressing section 163 is adopted. However, a configuration may be made such that the base material 110 (the base material jig 160) is fixed and the pressing section 163 is moved, and a configuration may also be made such that the two are moved together.

Furthermore, in the above-described embodiments of the second aspect, a slide type is adopted in which the bottom frame 102 of the forming apparatus can advance and retreat, that is, slide in the front-back direction with respect to the forming position below the heat plate 103, as shown in FIG. 8. However, for example, a rotary type in which the bottom frame 102 rotates circumferentially in a plan view is also acceptable.

INDUSTRIAL APPLICABILITY

The invention provides a forming apparatus and a forming method for thermoforming a sheet, thereby making the sheet adhere to a base material. According to the invention, productivity can be significantly improved, compared to a forming apparatus and a forming method in the related art.

DESCRIPTION OF REFERENCE SYMBOLS 1, 101: forming apparatus
2, 102: bottom frame
3, 103: heat plate
4, 104: sheet
10, 110: base material
10a, 110a: bottom surface
22, 122: base
60, 160: base material jig
61, 161: coil spring (biasing means)
63: blade
65, 165: pressing jig
80: blade
81: advancing and retreating means
85: side cutting device
R, R1: accommodation space (space)
163: pressing section
S: folded portion

The invention claimed is:
1. A forming apparatus comprising:
a stand;
a bottom frame provided on the stand;
a heat plate having a heating surface and a vent hole, and forming an accommodation space with the bottom frame and the stand in a state in which a sheet to be softened by heating is disposed between the heating surface and the bottom frame;
a base disposed in the accommodation space and on the stand;
biasing means disposed on the base;

a base material jig supported by the biasing means and provided on the base in a vertically movable manner; and a pressing section provided on and fixed to the base while surrounding the base material jig, wherein the base material jig is held in such a manner that the base material jig is movable downward and toward the base and the pressing section while overcoming biasing force of the biasing means by being pressed by the sheet that has been softened by being heated by the heat plate and deformed due to pressure of compressed air introduced into the accommodation space through the vent hole.

2. The forming apparatus according to claim 1, wherein, in the side peripheral surface of the base material jig, a concave portion is formed.

\* \* \* \* \*